(12) United States Patent
Fukuda et al.

(10) Patent No.: US 6,856,759 B1
(45) Date of Patent: Feb. 15, 2005

(54) RECORDING APPARATUS AND CODING APPARATUS

(75) Inventors: Hideki Fukuda, Nara (JP); Satoshi Kondo, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 869 days.

(21) Appl. No.: 09/654,783

(22) Filed: Sep. 1, 2000

(30) Foreign Application Priority Data

Sep. 2, 1999 (JP) .......................................... 11-248346

(51) Int. Cl.[7] .............................. H04N 7/04; H04N 7/26; H04N 5/91
(52) U.S. Cl. ............................. 386/96; 386/109; 386/68
(58) Field of Search ..................... 386/96, 109, 111, 386/112, 124, 125, 126, 45, 40, 39, 104, 105, 106, 27, 33, 68, 82; 360/32; H04N 7/04, 7/26, 5/91

(56) References Cited

U.S. PATENT DOCUMENTS

2003/0044163 A1 * 3/2003 Wilson et al. ................ 386/68
2003/0206718 A1 * 11/2003 Magasawa .................... 386/69

FOREIGN PATENT DOCUMENTS

| EP | 0737009 B1 | 10/1996 |
|---|---|---|
| JP | 8-336103 | 12/1996 |
| JP | 9-233417 | 9/1997 |
| JP | 10-336585 | 12/1998 |
| JP | 11-32297 | 2/1999 |
| JP | 11-289539 | 10/1999 |
| KR | 1996-0038902 | 11/1996 |

* cited by examiner

Primary Examiner—Robert Chevalier
(74) Attorney, Agent, or Firm—Wenderoth, Lind & Ponack, L.L.P.

(57) ABSTRACT

A recording apparatus includes a detector for detecting a video attribute, a detector for detecting an audio attribute, and an address information generator for generating specific address information which indicates a data write address at the time when the video attribute of the audio attribute changes, on the basis of the outputs from the detectors. The specific address information is written in a recording area of an optical disk, which area corresponds to VMGI constituting management information (VMG information) for each VOB. Therefore, when playing an audio video stream recorded on the optical disk, quick access can be made to the recording position in the stream where the attribute change occurs.

18 Claims, 22 Drawing Sheets

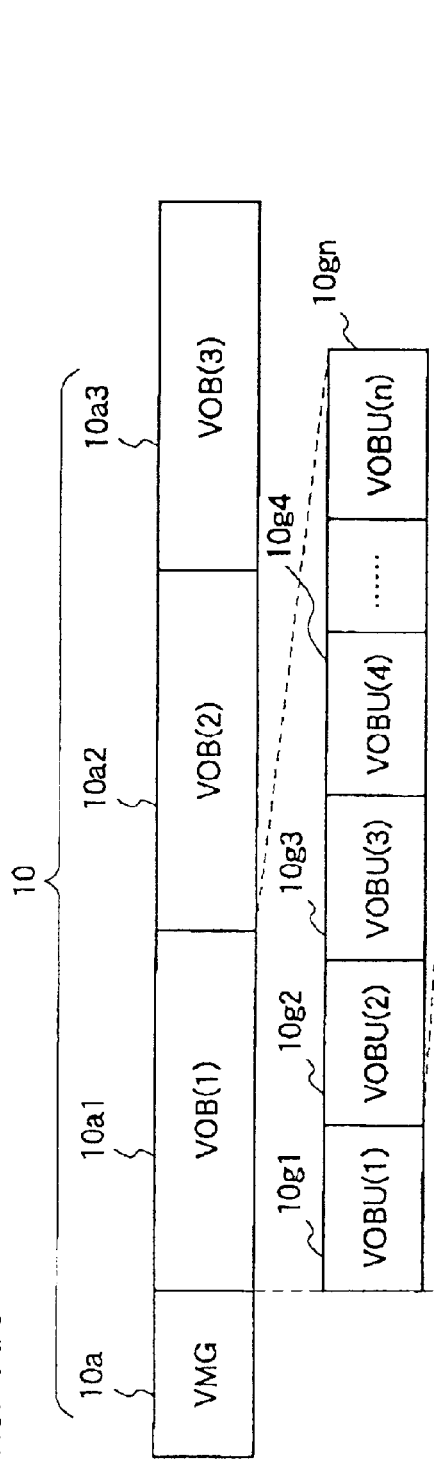
Fig.21 (a) Prior Art
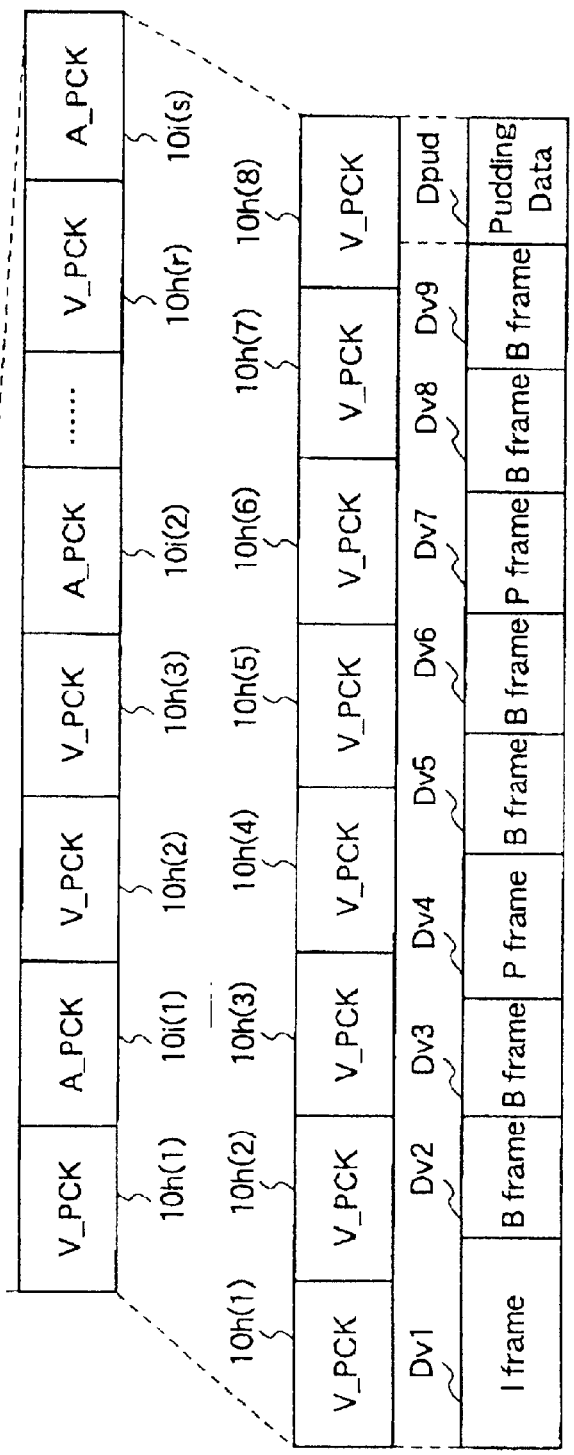
Fig.21 (b)

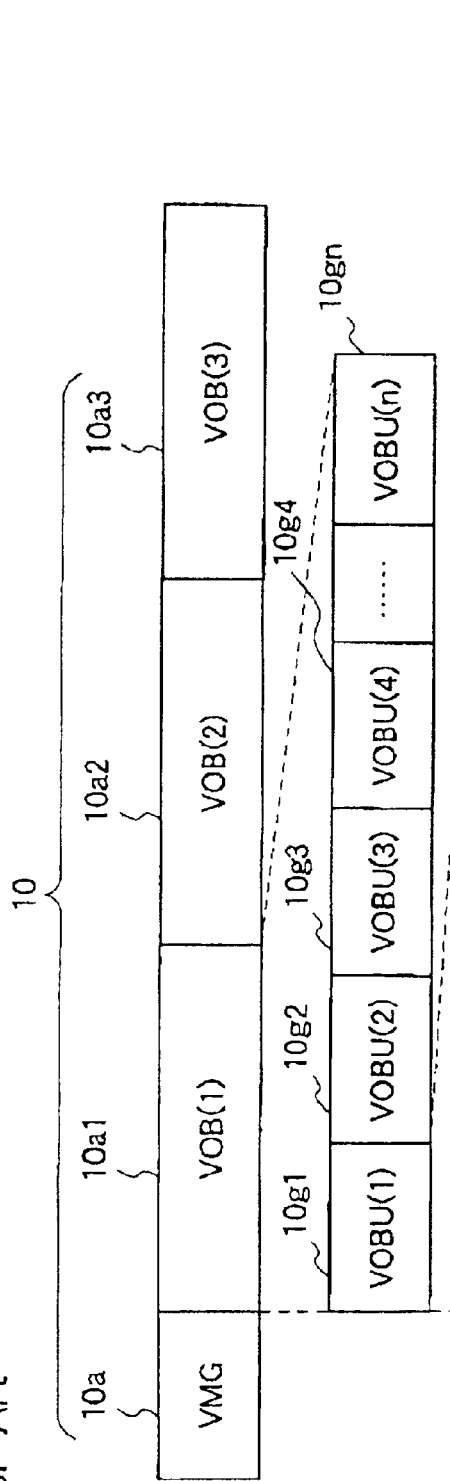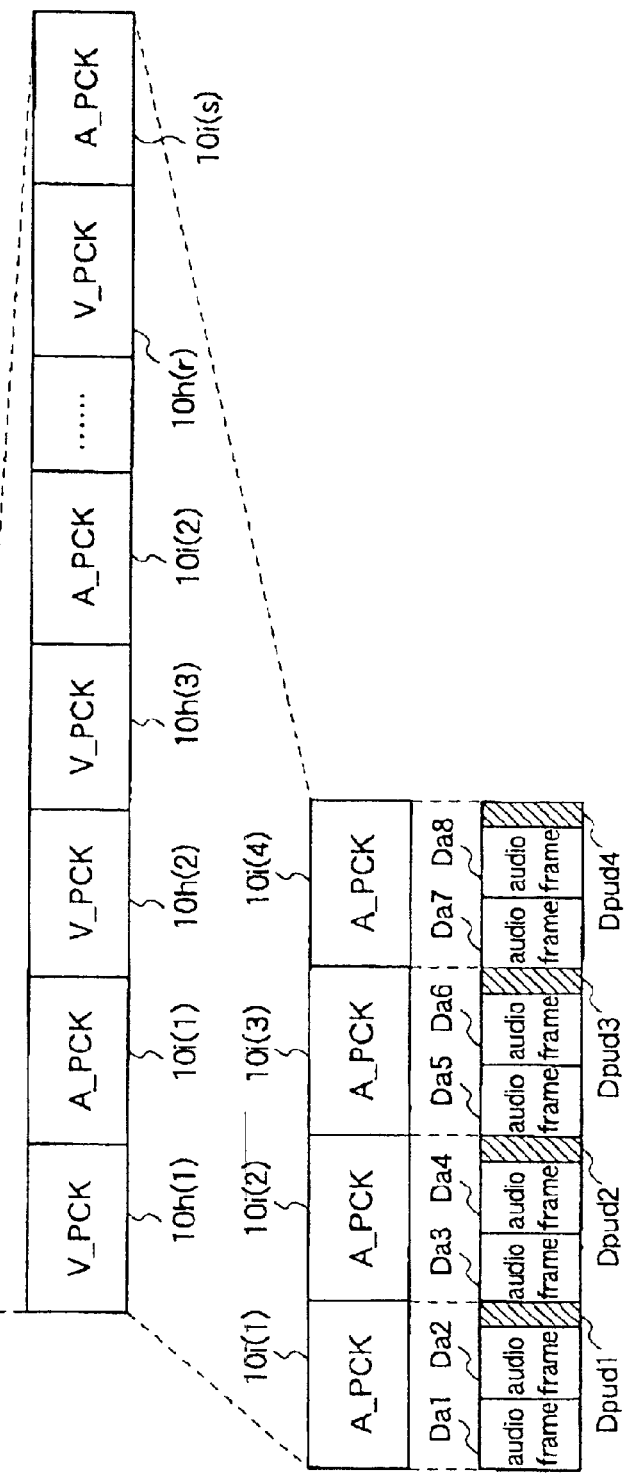
Fig.22 (a) Prior Art
Fig.22 (b)

RECORDING APPARATUS AND CODING APPARATUS

FIELD OF THE INVENTION

The present invention relates to a recording apparatus and a coding apparatus and, more particularly, to an apparatus for recording an audio video signal on a recording medium, and an apparatus for coding a video signal.

BACKGROUND OF THE INVENTION

On a playback-only DVD (Digital Video Disk), coded data which is obtained by performing compressive coding on an audio video signal corresponding to a specific program or the like, is recorded. This audio video signal includes an audio signal and a video signal, and coded audio data obtained by coding the audio signal and coded video data obtained by coding the video signal are recorded on the DVD as the above-described coded data. Further, the coded audio data and the coded video data are respectively packed. That is, these coded data are divided into plural pieces of data corresponding to first data units each having a predetermined data size (e.g., 2048 bytes).

In the following description, the coded audio data corresponding to the first data units are referred to as audio packs, and the coded video data corresponding to the first data units are referred to as video packs.

These audio packs and video packs are multiplexed and recorded on the DVD.

Furthermore, the coded data recorded on the DVD are divided into plural pieces of data corresponding to second data units each including plural pieces of the first data units, and the coded data are managed in the second data units. The coded data corresponding to the second data units are referred to as video objects (VOB).

For example, the coded data corresponding to one program is composed of at least one VOB. In the video standard relating to DVDROM, a group comprising at least one VOB is called a video object set (VOBS), and it is recorded on the DVD as one title.

Furthermore, on the DVD, together with the coded data corresponding to each title (program), the following information is recorded as information for managing the title (program) information indicating the position in the recording area of the DVD where the coded data corresponding to this title is recorded (recording position information, video attribute information corresponding to the coded data, and audio attribute information corresponding to the coded data. Each information is recorded in VOB units, as mentioned above.

The recording position information is various kinds of address information in the recording area of the DVD, for example, a header address and an end address of the area where the coded data of the VOBs corresponding to the title is recorded, or an address indicating the search point which has previously been set by the user.

The video attribute information relates to the compressive coding mode, TV system, aspect ratio, display mode, etc.

There are two types of compressive coding modes for DVD: a mode based on the MPEG-1 coding, and a mode based on the MPEG-2 coding. The compressive coding mode information indicates that the coded data of each VOB corresponds to either the former mode or the latter mode.

There are two types of TV systems: a system corresponding to the NTSC system (number of lines: 525, frame frequency: 59.97 Hz), and a system corresponding to the PAL system (number of lines: 625, frame frequency: 50 Hz). The TV system information indicates that the coded data of each VOB corresponds to either the former system or the latter system.

The aspect ratio is the ratio of the image size in the horizontal direction to the image size in the vertical direction, and two ratios, 4:3 and 16:3, are practically adopted. The aspect ratio information indicates that the coded data of each VOB corresponds to either 4:3 or 16:9.

Further, the display mode is a method of image display based on the video signal obtained from the coded data. For example, it is the pan & scan display mode or the letter box display mode. The display mode information indicates a display mode by which the video signal obtained from the coded data of each VOB is to be displayed.

In the pan & scan display mode, a wide image having an aspect ratio of 16:9 is displayed on a standard screen having an aspect ratio of 4:3, by removing left and right sides of the wide image. In the letter box display mode, a wide image having an aspect ratio of 16:9 is displayed on a standard screen having an aspect ratio of 4:3, by adding regions of a predetermined color to top and bottom sides of the wide image.

Meanwhile, there is the MPEG coding as an international standard of a compressive coding method for a video signal (hereinafter also referred to as image data). In the MPEG coding, the process of coding the image data is adaptively switched between intra-frame coding in which the image data is coded using a correlation of pixel vales in one frame, and inter-frame coding in which the image data is coded using a correlation of pixel values between frames. In the MPEG coding, the coded data corresponding to continuous plural frames are regarded as one unit, and the image comprising the continuous plural frames is called a group of pictures (GOP).

To be specific, in the MPEG coding, the image data of at least one frame among the plural frames constituting the GOP is subjected to the intra-frame coding while the image data of the remaining frames are subjected to the inter-frame coding.

There are two types of inter-frame coding: forward direction inter-frame predictive coding, and bi-directional inter-frame predictive coding. A frame to be subjected to the forward inter-frame predictive coding is called a P frame, and a frame to be subjected to the bi-directional inter-frame predictive coding is called a B frame. The image data of the P frame is subjected to the predictive coding with reference to the image data of a frame (reference frame) positioned before the P frame. The image data of the B frame 's subjected to the predictive coding with reference to the image data of two frames (reference frames) which are positioned close to and before and after the B frame. Usually, when coding a P frame, an I frame close to the P frame is used as a reference frame. When coding a B frame, an I frame and a P frame (or two P frames) which are close to the B frame are used as reference frames.

FIG. 17 is a diagram for explaining an example of the structure of the GOP, wherein continuous plural frames F(k−5) F(k+12) are associated with coded data D(k−5)~(k+12) corresponding to the respective frames. In FIG. 17, k is an arbitrary integer.

One GOP is composed of twelve frames from the B frame F(k−2) to the P frame F(k+9). For example, the P frame F(k+3) is subjected to the inter-frame predictive coding with reference to the I frame F(k). Further, the P frame F(k+6) is subjected to the inter-frame predictive coding with reference to the P frame F(k+3). Further, the B frames F(k+1) and F(k+2) are subjected to the inter-frame predictive coding with reference to the I frame F(k) and the P frame F(k+3).

The coded data corresponding to the respective frames, which are obtained in the above-described coding process, are subjected to the process of changing the arrangement of the coded data from the arrangement according to the order of displaying the images of the respective frames to the arrangement according to the order of decoding the respective frames, thereby reducing the capacity of a memory used for decoding (rearrangement process), To be specific, as shown in FIG. 17, in the arrangement obtained by subjecting the coded data corresponding to the GOP to the above-mentioned rearrangement process, the coded data D(k) of the I frame F(k) is positioned at the head of the GOP, followed by the coded data D(k−2) of the B frame F(k−2), the coded data D(k−1) of the B frame F(k−1), and the coded data D (k+3) of the P frame F(k+3).

Then, the coded data corresponding to the GOP is recorded on a recording medium or transmitted through a transmission medium, according to the order after the rearrangement process.

By the way, header information of a video stream (coded data obtained by coding a video signal) based on the MPEG standard includes, as video resolution information, information relating to the horizontal and vertical image sizes, frame frequency, and aspect ratio. Further, the header information includes information for recognizing that the video stream corresponds to either an interlace signal or a progressive signal.

In the standard relating to DVD, coded data which corresponds to at least one GOP and is equivalent to a display time longer than 0.4 sec. and shorter than 1.0 sec. is defined as a video object unit (VOBU) (third data unit), and a VOB is composed of a plurality of VOBU.

Each VOBU includes a plurality of packs (first data units), and the head position of the VOBU matches the head position of the packs. Further, at the head of the VOBU, a pack called a navigation pack, including information such as playback control information (PCI) and data search information (DSI), is placed.

In the field of television broadcasting, CS (Communication Satellite) broadcasting takes the lead in digitization, and digital broadcasting of a high-vision TV signal will be started subsequent to digital broadcasting of a standard TV signal. Accordingly, it is supposed that a standard TV signal and a high-vision TV signal will coexist in one broadcast sequence, or an interlace signal and a progressive signal will coexist in one broadcast sequence. In this case, the video resolutions of the TV signals which are broadcast in the same broadcast sequence will change with a change of a program.

In such digital TV broadcasting, a video stream and an audio stream are multiplexed according to the MPEG standard to be transmitted as a transport stream.

On the other hand, when recording the video stream and the audio stream on a DVD, the transport stream including the video stream and the audio stream is converted to a program stream to make the DVD have trick play functions, and this program stream is recorded on the DVD. Accordingly, when the audio video stream obtained from the received digital TV broadcast signal is recorded on the DVD, the audio video stream must be converted from the transport stream to the program stream (TS/PS conversion), and techniques relating to such stream conversion have already been developed. For example, Japanese Published Patent, Application No. Hei. 11-45512 (HITACHI) discloses a technique of TS/PS conversion, i.e., a technique for converting a transport stream to a program stream.

Hereinafter, a description will be given of the standard for recording the program stream on a recording tedium such as an optical disk.

FIG. 18 is a diagram for explaining the format of recorded data 10 based on the recording standard, and illustrates the specific contents of video attribute information (V_ATR) 10d1.

The recorded data 10 as data recorded on a recording medium by a recorder based on the above-described recording standard, and this recorded data 10 is composed of a video manager (VMG) 10a, and three video objects: a video object (VOB(1)) 10a1, a video object (VOB(2)) 10a2, and a video object (VOB(3)) 10a3. Each of the VOB(1) 10a1 VOB(3) 10a3 includes an audio video stream, and the VMG 10a includes management information for each VOB.

The recorded data 10 corresponds to one TV broadcast program. Further, the recorded data 10 is divided into, three VOBs according to the above-mentioned recording standard because the user performed two times of pause operations while recording the audio video stream of this program. That is, the boundary between the VOB(1) 10a1 and the VOB(2) 10a2 corresponds to the first pause position, and the boundary between the VOB(2) 10a2 and the VOB(3) 10a3 corresponds to the second pause position. In other words, in the recording process based on the DVD recording standard, when recording of the audio video stream is paused, the streams before and after the pause position are recorded as different VOBs on the recording medium.

As described above, the VMG 10a is management information for each VOB recorded, and the VMG 10a is composed of video manager information (VMGI) 10b1 and an audio video file information table (AVFIT) 10b2. The VMGI 10b1 includes, as search information, information relating to the time when each VOB bras recorded on the recording medium recording time), and the address of the recording area in the recording medium corresponding to each VOB (recording address).

Further, the AVFIT 10b2 includes audio video file table information (AVFITI) 10c, and plural pieces of video object stream information (VOB_STI) as many as the number of the recorded VOBs, i.e., VOB_STI(1) 10c1, VOB_STI(2) 10c2, and VOB_STI(3) 10c3. The AVFITI 10c includes information about the number of the recorded VOBs, and the like. Each of the VOB_STI 10c~10c3 includes the attribute information of the corresponding VOB. For example, the VOB_STI(1) 10c1 is composed of video attribute information (V_ATR) 10d1 and audio attribute information (A_ATR) 10d2.

Hereinafter, the video attribute information (V_ATR) 10d1 will be described in detail.

The V___ATR 10d1 includes compression mode information 10e1, horizontal video resolution (H_video resolution) information 10e2, vertical video resolution (V_video resolution) information 10e3, frame frequency information 10e4, TV system information 10e5, and aspect ratio information 10e6.

The compression mode information 10e1 is information for recognizing that the video stream of each vow is based on either the MPEG-1 coding or the MPEG-2 coding.

In the horizontal video resolution information 10e2, information for identifying the frame size in the horizontal direction corresponding to each VOB is described. To be specific, as the number of pixels in the horizontal direction, any of the following values is described: 352, 480, 544, 704, 720, 1440, 1920.

In the vertical video resolution information 10e3, information for identifying the frame size in the vertical direction corresponding to each VOB is described. To be specific, as the number of scanning lines, any of the following values is described: 240, 480, 576, 720, 1080.

The frame frequency information 10e4 is information for identifying the frame frequency corresponding to each VOB. For example, it shows any of the following frequencies: 24 Hz, 29.97 Hz, 30 Hz, 25 Hz, 50 Hz, 60 Hz.

The TV system information 10e5 is information for identifying that the video signal corresponding to each VOB is either an interlace signal or a progressive signal.

The aspect ratio information 10e5 is information for identifying the aspect ratio of the video signal corresponding to each VOB. For example, it shows the value of the aspect ratio (4:3 or 16:9), or the type of the letter box.

While the V_ATR 10d1 shown in FIG. 18 includes the compression mode information 10e1, the horizontal video resolution information 10e2, the vertical video resolution information 10e3, the frame frequency information 10e4, the TV system information 10e5, and the aspect ratio information 10e6, the V_ATR 10d1 may include caption data information (Line21_switch) 10e7 in addition to the information 10e1~10e6 as shown in FIG. 19. The caption data information 10e7 is information for identifying whether each of the video signals in the first and second fields includes Line21 data or not. The Line21 data is closed caption data which is superposed on a portion of the video signal corresponding to the 21st line.

Next, the audio attribute information (A_ATR) 10d2 will be described in detail.

FIG. 20 is a diagram for explaining the format of the above-described recorded data, and illustrates the specific contents of the audio attribute information (A_ATR) 10d2.

The A_ATR 10d2 includes, as information for identifying the attribute of the audio signal corresponding to each VOB, coding mode information 10f1, quantization information 10f2, dynamic range control (DRC) information 10f3, sampling frequency (fs) information 10f4, number-of-audio-channels information 10t5, and audio bit rate information 10f6.

The coding mode information 10f1 is information for identifying the type of the audio stream corresponding to each VOB. For example, it shows that the audio stream corresponds to any of the following modes: Dolby AC3, MPEG-1, MPEG-2, and Linear PCM (Pulse Code Modulation).

The quantization information 10f2 is information for identifying the number of quantized bits (16 bits, 20 bits, 24 bits, etc.) in the case where the audio stream corresponding to each VOB is subjected to Linear PCM.

The dynamic range control information 10f3 is information for identifying whether or riot the audio stream corresponding to each VOB includes dynamic range control data in the MPEG-1 or MPEG-2 coding.

The sampling frequency information 10f4 is information for identifying the sampling frequency (48 kHz, 96 kHz, etc.) of the audio stream corresponding to each VOB.

The number-of-audio-charnels information 10f5 is information for identifying the number of channels (1ch(mono), 2ch(stereo), 2ch(dual mono), 3ch, 4ch, 5ch, 6ch, 7ch, 8ch, etc.) of the played audio signal obtained from the audio stream corresponding to each VOB.

The audio bit rate information 10f6 is information for identifying the bit rate (64 kbps, 89 kbps, 112 kbps, 126 kbps, 160 kbps, 192 kbps, 224 kbps, 256 kbps, 320 kbps, 384 kbps, 448 kbps, 768 kbps, 1536 kbps, etc.) of the audio stream corresponding to each VOB.

It is possible to recognize the recording time of the audio video stream corresponding to each VOB, the recording address thereof, and the attribute information of each VOB, by reading the VMG 10a from the data 10 recorded on the recording medium (optical disk).

Next, the structure of the VOB in the recorded data 10 will be described with reference to FIGS. 21(a), 21(b), 22(a) and 22(b). FIGS. 21(a) and 22(a) show the detailed structure of the VOB(1) 10a1 in the recorded data 10.

The VOB(1) 10a1 is composed of plural video object units, i.e., VOBU(1) 10g1, VOBU(2) 10g2, VOBU(3) 10g13, VOBU(4) 10g4, VOBU(n) 10gn.

One VOBU includes an audio video stream which corresponds to at least one GOP and is equivalent to a display time of 0.4~1.0 sec. For example, the VOBU(1) 10g1 is composed of plural video packs (V___PCK) 10h(1), 10h(2), 10h(3), . . . , 10h(r), and plural audio packs (A_PCK) 10i(1), 10i(2), . . . , 10i(s). Each of the video packets and audio packets has a predetermined data size, and the data size is 2048 bytes in this case FIG. 21(b) shows the video packs 10h(1)~10h(8) associated with the streams of the respective frames constituting the GOP.

The VOBU(1) 10g1 includes a video stream corresponding to one GOP. To be specific, the video stream included in the VOBU(1) 10g1 is composed of I frame coded data Dv1, B frame coded data Dv2 and Dv3, P frame coded data Dv4, B frame coded data Dv5 and Dv6, P frame coded data Dv7, B frame coded data Dv8 and Dv9, and padding data Dpud.

Since each VOBU is composed of the video packs and audio packs each having 2048 bytes, the data size of the VOBU should be an integer multiple of 2048 bytes. So, the padding data Dpud is added to the video stream corresponding to one GCP to make the data size of the video stream included in the VOBJ equal to an integer multiple of 2048 bytes.

FIG. 22(b) shows the audio packs 10i(1)~10i(4) constituting the VOBU(I) 10g1, associated with the streams of the respective audio frames.

The VOBU(1) 10a1 includes an audio stream corresponding to one GOP. To be specific, the audio stream included in the VOBU(1) 10g1 is composed of coded data of the audio frames Da1 Da8 and the padding data Dpud1~Dpud4 corresponding to the respective audio packs (A_PCK) 10i(1) ~10i(4). That is, the A_PCK 10i(1) includes the coded data of the audio frames Da1 and Da2 and the padding data Dpud1, the A_PCK 10i(2) includes the coded data of the audio frames Da3 and Da4 and the padding data Dpud2, the A_PCK 10i(3) includes the coded data of the audio frames Da5 and Da6 and the padding data Dpud3, and the A_PCK 10i(4) includes the coded data of the audio frames Da7 and Da8 and the padding data Dpud4.

As described above, the audio stream of one A_PCK 10i(s) is composed of the coded data of two audio frames and the padding data to make the data size of the audio stream included in the VOBU equal to an integer multiple of 2048 bytes.

While in FIGS. 21(b) and 22(b) only the structures of the VOB 10a1 and VOBU(1) 10g1 are described, the VOB 10a2 and VOB 10a3 and the VOBU(2) 10g2 VOBU(n) 10gn also have the same structures as those of the VOB 10a1 and VOBU(1) 10g1, respectively.

As described above, since the VOBU has the data structure which is divided into data units each having a predetermined data size (2048 bytes), address management for the VOBU is simplified, and access to data in VOBU units on the recording medium is facilitated.

In the conventional recording apparatus however, the audio video stream is usually recorded as one VOB, and management of its attribute is performed for the whole stream in the lump. This results in various drawbacks as follows.

When the conventional recording apparatus records the audio video stream, the stream inputted to the recording apparatus from when the recording is started to when the recording is ended, is recorded as one VOB on the recording medium. However, when the recording operation is paused, the stream inputted before the pause and the stream inputted after the pause are recorded as different VOBs on the recording medium. Further, there are other causes by which the audio video stream is recorded as plural VOBs.

In other words, in the conventional recording apparatus, the audio video stream corresponding to one program is usually recorded as one VOB on the recording medium. When the recording of the stream is paused to prevent a portion of the stream corresponding to a CM (commercial) or the like from being recorded, the audio video stream corresponding to one program is recorded as different VOBs.

By the way, since a digital broadcast signal is usually inputted to the recording apparatus as an MPEG stream (audio video stream corresponding to the MPEG standard), when the digital broadcast signal is received and recorded, the video attribute (e.g., video resolution) changes from scene to scene during the recording, in contract with recording of an analog broadcast signal. For example, the resolution in the horizontal direction changes from 720 pixels to 312 pixels.

Further, when a standard TV broadcast program and a high-vision TV broadcast program are recorded continuously, the aspect ratio, which is an attribute of the recorded data corresponding to each program, changes from 4:3 to 16:9 at the point where the program changes.

In this case, two audio video streams having different attributes are recorded as one VOB, whereby management of the video attribute of the stream recorded on the recording medium becomes difficult.

Further, in the process of playing the audio video stream recorded or the recording medium, since the video stream (coded data) is decoded with the video resolution as a parameter, management of the video resolution as the video attribute is insufficient. If the change of the video re olution is not posted to the decoder, decoding of the video stream results in failure.

Furthermore, since the recording position of the audio video stream is managed by the address corresponding to each VOBU which is a constituent of the VOB, direct access cannot be made to the position where the video resolution changes, in the stream included in the VOBU. Therefore, random access to the beginning of the program, based on the change of the video resolution, cannot be performed at high speed.

Moreover, although the coded data included in the VOBU is divided into data units (packs) each having a predetermined data size (2048 bytes) and each pack is managed by the address indicating the recording position of its head data, the position corresponding to the video resolution change point in the stream is not always equal to the head position of the pack as the access unit and, therefore, the video resolution change position in the stream cannot accessed by using the address indicating the recording position of the pack.

Furthermore, when the video signal is coded by the MPEG-2 coding, the coding mode for each frame is decided based on a predetermined rule, and coding is performed so that a GOP comprising at least one I frame, plural P frames, and plural B frames is constituted according to the decided coding mode. Therefore, when the video resolution changes, the video resolution may vary between the frames constituting one GOP, and a stream adapted to the MPEG-2 standard cannot be generated.

Furthermore, in the MPEG coding, the inter-frame predictive coding is carried out, that is, the video signal of the target frame to be processed is coded with reference to the video signal of the reference frame which has already been coded. Therefore, when the video resolution changes, the video resolution varies between the target frame and the reference frame, and the inter-frame predictive coding results in failure.

Also when recording the coded data obtained by coding the TV signal whose aspect ratio changes, the following drawbacks will occur like in the above-described case where the video resolution changes.

That is, when the video aspect ratio changes, management of the video attribute of the recorded audio video stream (coded data) becomes difficult. Further, in the playback process, decoding of the coded data results in failure due to the change of the video aspect ratio. Moreover, quick access cannot be made to the position where the video aspect ratio changes, in the video stream.

Moreover, in the MPEG coding, when the video aspect ratio changes, a stream adapted to the MPEG-2 standard cannot be generated, or the inter-frame predictive coding results in failure, as in the above-described case where the video resolution changes.

With respect to a video signal having plural video attributes not only the video resolution and the video aspect ratio but also the coding mode and the like, access cannot be made to the position where the video attribute changes, in the recorded video stream.

Further, w-th respect to an audio video signal including not only a video signal but also an audio signal appended to the video signal, access cannot be made to the position where the audio attribute (coding mode, number of channels, bit rate, etc.) of the audio signal changes, in the recorded data corresponding to this audio video signal.

SUMMARY OF THE INVENTION

The present invention is made to solve the above-described problems, and it is an object of the present invention to provide a recording apparatus which can record coded data corresponding to a TV signal in which at least one of the video attribute (coding mode, video resolution, video aspect ratio, or the like) and the audio attribute (coding mode, number of channels, bit rate, or the like) changes, so as to enable quick access to the position where the attribute changes.

It is another object of the present invention to provide a recording apparatus which can record coded data corresponding to a TV signal in which at least one of the video attribute and the audio attribute changes, on a recording medium, while managing the coded data so as to enable satisfactory decoding of the coded data.

It is still another object of the present invention to provide a coding apparatus which can code a video signal in which the video attribute (coding mode, video resolution, video aspect ratio, or the like) changes, according to a predetermined coding method such as MPEG.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a recording apparatus for recording, on a recording medium, an audio video stream which is obtained by coding an audio video signal including an audio signal and a video signal. This apparatus comprises an attribute detector for detecting an attribute relating to at least one of the video signal and the audio signal on the basis of the audio video stream, and outputting attribute data indicating the attribute; an information generator for detecting a recording position in the audio video stream recorded on the recording medium, which recording position corresponds to a point where the attribute changes, or a recording time of the audio video stream based on a reference time, which recording time corresponds to the attribute change point, and outputting attribute change information indicating the recording position or the recording time; and a recorder for recording the attribute data and the attribute change information on the recording medium. Therefore, when playing the audio video stream recorded on the recording medium, a portion of the audio video stream where the video attribute or the audio attribute changes can be recognized, whereby the portion of the stream where the attribute change occurs can be accessed quickly.

According to a second aspect of the present invention, in the recording apparatus of the first aspect, the attribute detector detects a video attribute relating to the video signal and an audio attribute relating to the audio signal, and outputs attribute data indicating each attribute; and the recorder records the attribute data indicating the video attribute and the attribute data indicating the audio attribute in predetermined recording areas of the recording medium, respectively. Therefore, when playing the audio video stream, a portion of the stream where either the video attribute or the audio attribute changes can be accessed quickly.

According to a third aspect of the present invention, in the recording apparatus of the first aspect, the attribute detector detects the video resolution of the video signal as an attribute relating to the video signal, and outputs video resolution data indicating the video resolution. On on the basis of the video resolution data, the information generator detects a recording position in the stream recorded on the recording medium, which recording position corresponds to a point where the video resolution changes, or a recording time of the stream based on a reference time, which recording time corresponds to the video resolution change point, and outputs attribute change information indicating the recording position or the recording time; and the recorder records the video resolution data and the resolution change information on the recording medium. Therefore, when playing the audio video stream, a portion of the stream where the video resolution changes can be accessed quickly.

According to a fourth aspect of the present invention, in the recording apparatus of the first aspect, the attribute detector detects the aspect ratio of the video signal as an attribute relating to the video signal, and outputs aspect ratio data indicating the aspect ratio. On the basis of the aspect ratio data, the information generator detects a recording position in the stream recorded on the recording medium, which recording position corresponds to a point where the aspect ratio changes, or a recording time of the stream based on a reference time, which recording time corresponds to the aspect ratio change point, and outputs aspect ratio change information indicating the recording position or the recording time; and the recorder records the aspect ratio data and the aspect ratio change information on the recording medium. Therefore, when playing the audio video stream, a portion of the stream where the aspect ratio changes can be accessed quickly.

According to a fifth aspect of the present invention, there is provided a recording apparatus for recording, on a recording medium, an audio video stream which is obtained by coding an audio video signal including an audio signal and a video signal. This apparatus comprises: a packing unit for performing packing to divide the audio video stream into plural streams corresponding to packs as data units each having a predetermined size, and outputting the audio video stream corresponding to each pack as pack data; a recorder for recording each pack data on the recording medium, as an access unit to the recording medium; and an attribute detector for detecting an attribute relating to at least one of the video signal and the audio signal, and outputting attribute data indicating the attribute. The packing unit performs the packing such that a position in the audio video stream, where the attribute changes, is positioned at the head of the pack. Therefore, a portion where the video attribute or the audio attribute changes, of the audio video stream whose recording addresses are managed in pack units, can be recognized. When playing the audio video stream, the portion p where the attribute change occurs can be accessed quickly.

According to a sixth aspect of the present invention, in the recording apparatus of the fifth aspect, the attribute detector detects a video attribute relating to the video signal and an audio attribute relating to the audio signal on the basis of the audio video stream, and outputs video attribute data indicating the video attribute and audio attribute data indicating the audio attribute; and the recorder records the video attribute data and the audio attribute data in predetermined areas of the recording medium, respectively. Therefore, when playing the audio video stream recorded on the recording medium, the video attribute and the audio attribute corresponding to this stream can be identified.

According to a seventh aspect of the present invention, the recording apparatus of the fifth aspect further comprises an information generator for detecting a recording position in the audio video stream, recorded on the recording medium, which recording position corresponds to a point where at least one of the audio attribute and the video attribute changes, or a recording time of the audio video stream based on a reference time, which recording time corresponds to the attribute change point, and outputting attribute change information indicating the recording position or the recording time; and the recorder records the attribute change information on the recording medium. Therefore, when playing the audio video stream recorded on the recording medium, a portion of the stream where the video attribute or the audio attribute changes can be accessed quickly by reading the recording position or the recording time corresponding to the attribute change point.

According to an eighth aspect of the present invention, in the recording apparatus of the fifth aspect, the attribute detector detects the video resolution of the video signal as an attribute relating to the video signal, and outputs video resolution data indicating the resolution; and the packing unit performs the packing, on the basis of the video resolution data, such that a position in the video stream, where the video resolution changes, is positioned at the head, of the pack. Therefore, a portion where the video resolution changes, of the audio video stream whose recording addresses are managed in pack units, can be recognized. When playing the audio video stream, the portion of the stream where the video resolution changes can be accessed quickly.

According to a ninth aspect of the present invention, in the recording apparatus of the fifth aspect, the attribute detector detects the aspect ratio of the video signal as an attribute relating to the video signal, and outputs aspect ratio data indicating the aspect ratio; and the packing unit performs the packing, on the basis of the aspect ratio data, such that a position in the video stream, where the aspect ratio changes, is positioned at the head of the pack. Therefore, a portion where the aspect ratio changes, of the audio video stream whose recording addresses are managed in pack units, can be recognized. When playing the audio video stream, the portion where the aspect ratio change occurs can be accessed quickly.

According to a tenth aspect of the present invention, there is provided a recording apparatus for recording, on a recording medium, an audio video stream which 's obtained by coding an audio video signal including an audio signal and a video signal. This apparatus comprises a video object composer for dividing the audio video stream into plural streams corresponding to management units for managing the audio video stream, and outputting the stream corresponding to each management unit as video object data; a recorder for recording management information for managing each video object data on the recording medium; and an attribute detector for detecting an attribute relating to at least one of the video signal and the audio signal on the basis of the audio video stream, and outputting attribute data indicating she attribute. When the attribute changes, the video object composer divides the audio video stream, on the basis of the attribute data, such that a portion of the audio video stream before the attribute change point and a portion of the audio video stream after the attribute change point are output as different video object data. Therefore, when playing the audio video stream recorded on the recording medium, decoding of each video object data is performed on the basis of the video attribute or audio attribute which is managed in video object units.

According to an eleventh aspect of the present invention, in the recording apparatus of the tenth aspect, the management information includes information relating to the recording position of each video object data on the recording medium, or the recording time of each video object data based on a reference time. Therefore, the audio video stream recorded on the recording tedium can be managed in video object units.

According to a twelfth aspect of the present invention, in the recording apparatus of the tenth aspect, the attribute detector detects a video attribute relating to the video signal and an audio attribute relating to the audio signal on the basis of the audio video stream, and outputs video attribute data indicating the video attribute and audio attribute data indicating the audio attribute; and the management information includes video attribute information indicating the video attribute and audio attribute information indicating the audio attribute. Therefore, the attribute of the audio video stream recorded on the recording medium can be managed in video object units.

According to a thirteenth aspect of the present invention, in the recording apparatus of the tenth aspect, the attribute detector detects the video resolution of the video signal as an attribute relating to the video signal, and outputs video resolution data indicating the resolution; and when the video resolution changes, the video object composer divides the video stream, on the basis of the video resolution data, such that a portion of the video stream before the video resolution change point and a portion of the video stream after the video resolution change point are output as different video object data. Therefore, the video attribute can be unified with respect to one video object data. Thereby, when playing the audio video stream recorded on the recording medium, decoding of each video object data can be performed on the basis of the video resolution which is managed in video object units.

According to a fourteenth aspect of the present invention, in the recording apparatus of the tenth aspect, the attribute detector detects the aspect ratio of the video signal as an attribute relating to the video signal, and outputs aspect ratio data indicating the aspect ratio; and when the aspect ratio changes, the video object composer divides the video stream, on the basis of the aspect ratio data, such that a portion of the video stream before the aspect ratio change point and a portion of the video stream after the aspect ratio change point are output as different video object data. Therefore, the aspect ratio can be unified with respect to one video object data. Thereby, when playing the audio video stream recorded on the recording medium, decoding of each video object data can be performed on the basis of the aspect ratio which is managed in video object units.

According to a fifteenth aspect of the present invention, a coding apparatus for coding a video signal comprises a video encoder for subjecting the video signal to intra-frame coding or inter-frame coding such that a group of frames including at least one frame subjected to the intra-frame coding is generated, and a video stream corresponding to the frame group is output as a stream unit that can be accessed randomly; and a video attribute detector for detecting a video attribute of the video signal, and outputting video attribute data indicating the video attribute. The video encoder forms the frame group such that a specific frame, whose video attribute is different from that of a frame positioned just before it, is stored as a head frame in the frame group. Therefore, when playing the video stream recorded on the recording medium with each frame group as an access unit, a portion of the video stream where the video attribute changes can be accessed quickly.

According to a sixteenth aspect of the present invention, the coding apparatus of the fifteenth aspect further comprises an audio attribute detector for detecting an audio attribute of an audio signal appended to the video signal, and outputting audio attribute data indicating the audio attribute; and the video encoder forms the frame group such that a specific frame, whose video or audio attribute is different from that of a frame positioned just before it, is stored as a head frame in the frame group. Therefore, when playing the video stream recorded on the recording medium with each frame group as an access unit, a portion of the video stream corresponding to the attribute charge point can be accessed quickly.

According to a seventeenth aspect of the present invention, the coding apparatus of the sixteenth aspect further comprises a packing unit for performing packing to divide the video stream into plural streams corresponding to packs as data units each having a predetermined size, and outputting the stream corresponding to each pack as pack data; and the packing unit performs the packing such that a position in the video stream, where the video or audio attribute changes, is positioned at the head of the pack. Therefore, when playing the video stream recorded on the recording medium while managing the addresses in pack units, a portion of the stream corresponding to the attribute change point can be accessed quickly.

According to an eighteenth aspect of the present invention, in the coding apparatus of the fifteenth aspect, the video encoder performs coding on each frame in a specific frame group including the specific frame, without referring to the video signal corresponding to frames in a frame group which has been coded previously to the specific frame group. Therefore, the video stream corresponding to the specific frame group can be played randomly. That is, coding of the specific frame group is performed without referring to the video signal of an already processed frame group whose video attribute video resolution) is different from that of the specific frame group. Therefore, when a target frame to be coded is subjected to inter-frame prediction coding, only a frame whose video attribute (video resolution) is identical to that of the target frame is used as a reference frame, whereby decoding of the video stream is facilitated. Further, when the target frame is subjected to inter-frame prediction coding, only a frame whose aspect ratio is identical to that of the target frame is used as a reference frame, whereby the target frame is coded efficiently.

According to a nineteenth aspect of the present invention, in the coding apparatus of the fifteenth aspect, the video attribute detector detects the video resolution of the video signal as a video attribute on the basis of the video signal, and outputs video resolution data indicating the video resolution; and the video encoder forms the frame group, on the basis of the video resolution data, such that a specific frame, whose video resolution is different from that of a frame positioned just before it, is stored as a head frame in the frame group. Therefore, when playing the video stream recorded on the recording medium with each frame group as an access unit, a portion of the video stream where the video resolution changes can be accessed quickly.

According to a twentieth aspect of the present invention, the coding apparatus of the nineteenth aspect further comprises a packing unit for performing packing to divide the video stream into plural streams corresponding to packs as data units each having a predetermined size, and outputting the stream corresponding to each pack as pack data; and the packing unit performs the packing such that a position in the video stream, where the video resolution changes, is positioned at the head of the pack. Therefore, when playing the video stream recorded on the recording medium while managing the addresses in pack units, a portion of the stream corresponding to the resolution change point can be accessed quickly.

According to a twenty-first aspect of the present invention, in the coding apparatus of the fifteenth aspect, the attribute detector detects the aspect ratio of the video signal as the video attribute on the basis of the video signal, and outputs aspect ratio data indicating the aspect ratio; and the video encoder forms the frame group, on the basis of the aspect ratio data, such that a specific frame, whose aspect ratio is different from that of a frame positioned just before it, is stored as a head frame in the frame group. Therefore, when playing the video stream recorded on the recording medium with each frame group as an access unit, a portion of the video stream where the aspect ratio changes can be accessed quickly.

According to a twenty-second aspect of the present invention, the coding apparatus of the twenty-first aspect further comprises a packing unit for performing packing to divide the video stream into plural streams corresponding to packs as data units each having a predetermined size, and outputting the stream corresponding to each pack as pack data; and the packing unit performs the packing such that a position in the video stream, where the aspect ratio changes, is positioned at the head of the pack. Therefore, when playing the video stream recorded on the recording medium while managing the addresses in pack units, a ort-on of the stream corresponding to the aspect ratio change point can be accessed quickly.

BRIEF DESCRIPTION OF THE DRAWINGS

FIGS. 21(a) and 21(b) are diagrams illustrating a format of a video object (21(a)) employed when recording an audio video stream on a recording medium, and video packets (21(b)) constituting the video object.

FIGS. 22(a) and 22(b) are diagrams illustrating a format of a video object (22(a)) employed when recording an audio video stream on a recording medium, and video packets (22(b), constituting the video object.

DETAILED DESCRIPTION OF THE PREFERRED EMBODIMENTS

[Embodiment 1]

Figure 1:
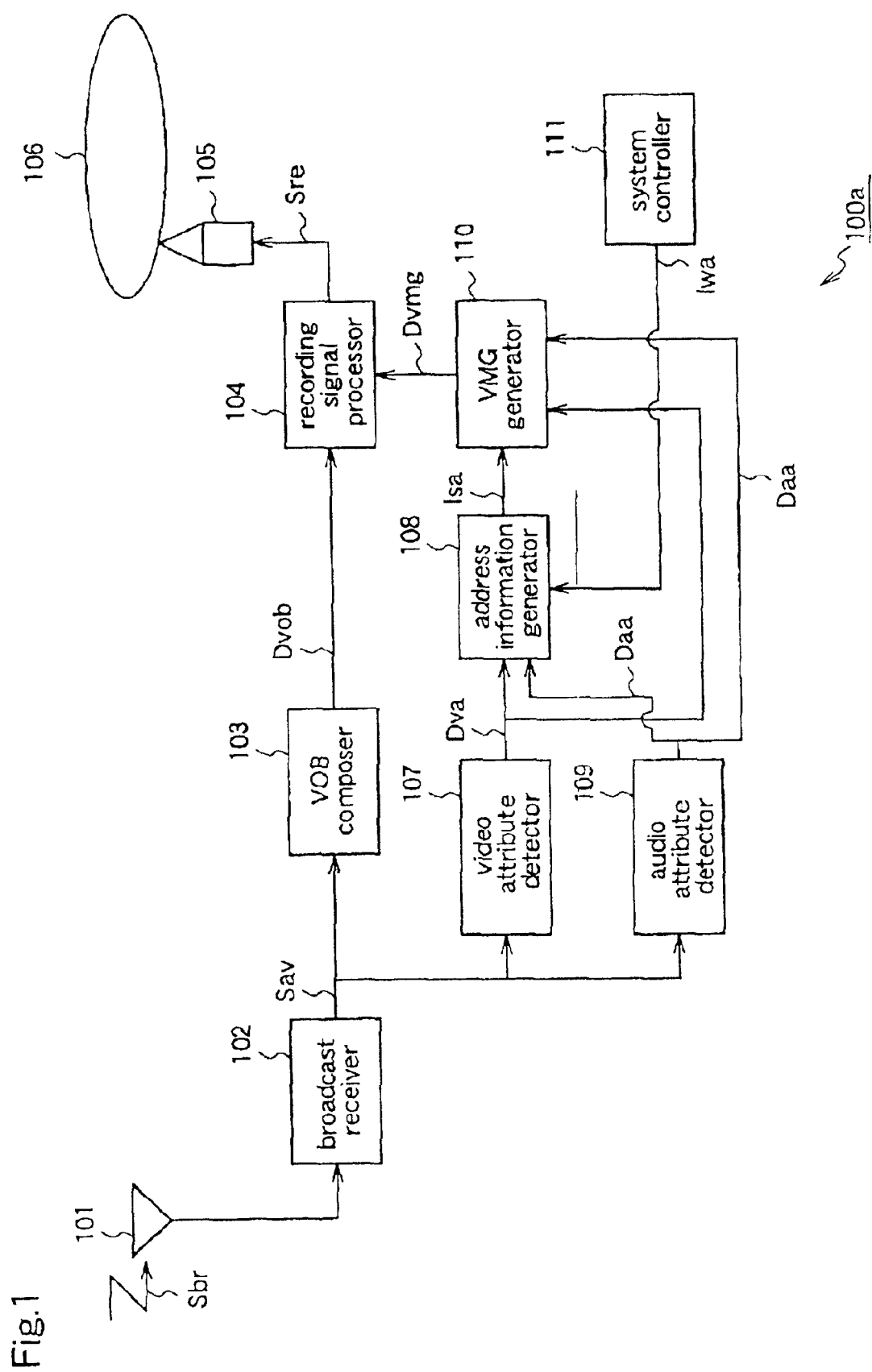
FIG. 1 is a block diagram for explaining a recording apparatus according to a first embodiment of the present invention.

FIG. 1 is a block diagram for explaining a recording apparatus 100a according to a first embodiment of the present invention.

The recording apparatus 10a includes a broadcast receiver 102 and a VOB composer 103. The broadcast receiver receives a digital broadcast signal Sbr, and outputs an audio video stream Sav. The VOB composer 103 converts the audio video stream Sav into recordable data according to a format of a video standard, and outputs VOB data Dvob.

The broadcast receiver 102 has a TS/PS conversion function for converting a transmission format stream (transport stream) into a record format stream (program stream), and the audio video stream Sav outputted from the broadcast receiver 102 is a program stream. Further, a packing unit (not shown) is provided between the broadcast receiver 102 and the VOB composer 103. The packing unit divides the audio video stream Sav into plural streams corresponding to first data units each having a predetermined size (2 Kbyte). The packing unit outputs data (PCK data) corresponding to each data unit (pack) to the VOB composer 103. Further, this packing unit outputs, as the PCK data, audio packs containing audio streams (A_PCK) and video packets containing video streams (V PCK). Although the PCK data is fixed-length data of 2 Kbyte, it may be variable-length data. In this case, the data size is written in the header of each pack. Further, as shown in FIGS. 21(a) & (b) and 22(a) & (b), the VOB composer 103 forms a third data unit (VOBU) comprising plural packs on the basis of the PCK data supplied from the packing unit, and further forms a second data unit (VOB) comprising plural VOBUs, and outputs the data corresponding to the VOB as the above-described VOB data Dvob.

The recording apparatus 100a further includes a video attribute detector 107 and an audio attribute detector 109. The video attribute detector 107 receives the audio video stream Sav, detects a video attribute of the video stream included in the audio video stream Sav by analyzing header information of the video stream, and outputs data indicating the video attribute (video attribute data Dva). The audio attribute detector 109 receives the audio video stream Sav, detects an audio attribute of the audio stream included in the audio video stream Sav by analyzing header information of the audio stream, and outputs data indicating the audio attribute (audio attribute data Daa).

The video attribute is, for example, any of the coding mode (e.g., MPEG-1 coding or MPEG-2 coding), horizontal frame size, the vertical frame size, frame frequency, pixel sampling frequency, chrominance signal component format, aspect ratio, letter box, bit rate, scanning mode (interlace or progressive), etc. The video attribute detector 107 detects at least one of these attributes. The audio attribute is, for example, any of the coding mode, number of channels, sampling frequency, number of quantized bits, dynamic range control, bit rate, etc. The audio attribute detector 109 detects at least one of these attributes.

The recording apparatus 100a further includes a system controller 111, an address information generator 108, and a VMG generator 110. The system controller 111 generates write address information Iwa which indicates a position (write address) where data is to be written in the recording area of the recording medium 106. The address information generator 108 outputs specific address information Isa which indicates the write address at the time when the attribute changes, on the basis of the video attribute data Dva, the audio attribute data Daa, and the address information Iwa. The VMG generator 110 generates VMG information Dvmg which is management information for each VOB, on the basis of the video attribute data Dva, the audio attribute data Daa, and the specific address information Isa. When the video attribute or audio attribute of the audio video stream Sav changes, the VMG generator 110 outputs the VMG information Dvmg including the specific address information Isa which indicates the write address at the time when the attribute change occurs.

The recording apparatus 100a further includes a recording signal processor 104 and a recording head 105. The recording signal processor 104 subjects the VOB data Dvob from the VOB composer 103 and the VMG information Dvmg from the VMG generator 110 to addition of error correcting code and recording modulation, and outputs a recording signal Sre corresponding to the VOB data. The recording head 105 writes the recording signal Sre on the recording medium 106 such as an optical disk.

Hereinafter, the operation of the recording apparatus 103a will be described.

The broadcast signal Sbr from the antenna 101 is received by the broadcast receiver 102, wherein the broadcast signal Sbr is subjected to predetermined processing to extract the audio video stream Sav. This audio video stream Sav is output to the packing unit (not shown), the video attribute detector 107, and the audio attribute detector 109. The audio video stream Sav is output as a program stream by the TS/PS conversion function of the broadcast receiver 102.

In the packing unit, the audio video stream Sav is packed as described above, and the stream Sav corresponding to each pack is output as PCK data to the VOB composer 103.

In the VOB composer 103, the audio video stream (PCK data) Sav is converted to VOB data Dvob (see FIGS. 21(a) & (b) and 22(a) & (b)) according to the format of the DVD recording standard, and then the VOB data Dvob is output to the recording signal processor 104.

In the recording signal processor 104, the VOB data Dvob is subjected to addition of error correcting code and recording modulation, thereby generating a recording signal Sre corresponding to the VOB data Dvob. This recording signal Sre is written in a predetermined recording area of the optical disk (recording medium) 106 by the recording head 105 according to the write address information Iwa generated by the system controller 111.

In the video attribute detector 107, a video attribute of the video stream included in the audio video stream Sav is detected by analyzing the header information of the video stream, and video attribute data Dva indicating the video attribute is output to the address information generator 108 and the VMG generator 110.

On the other hand, in the audio attribute detector 109, an audio attribute of the audio stream included in the audio video stream Sav is detected by analyzing the header information of the audio stream, and audio attribute data Daa indicating the audio attribute is output to the address information generator 108 and the VMG generator 110.

In the address information generator 108, when at least one of the video attribute and the audio attribute changes, specific address information sa indicating the write address at the time when the attribute change occurs is generated, on the basis of the write address information Iwa, the video attribute data Dva, and the audio attribute data Daa. The specific address a information Isa is output to the VMG generator 110.

Figure 19:
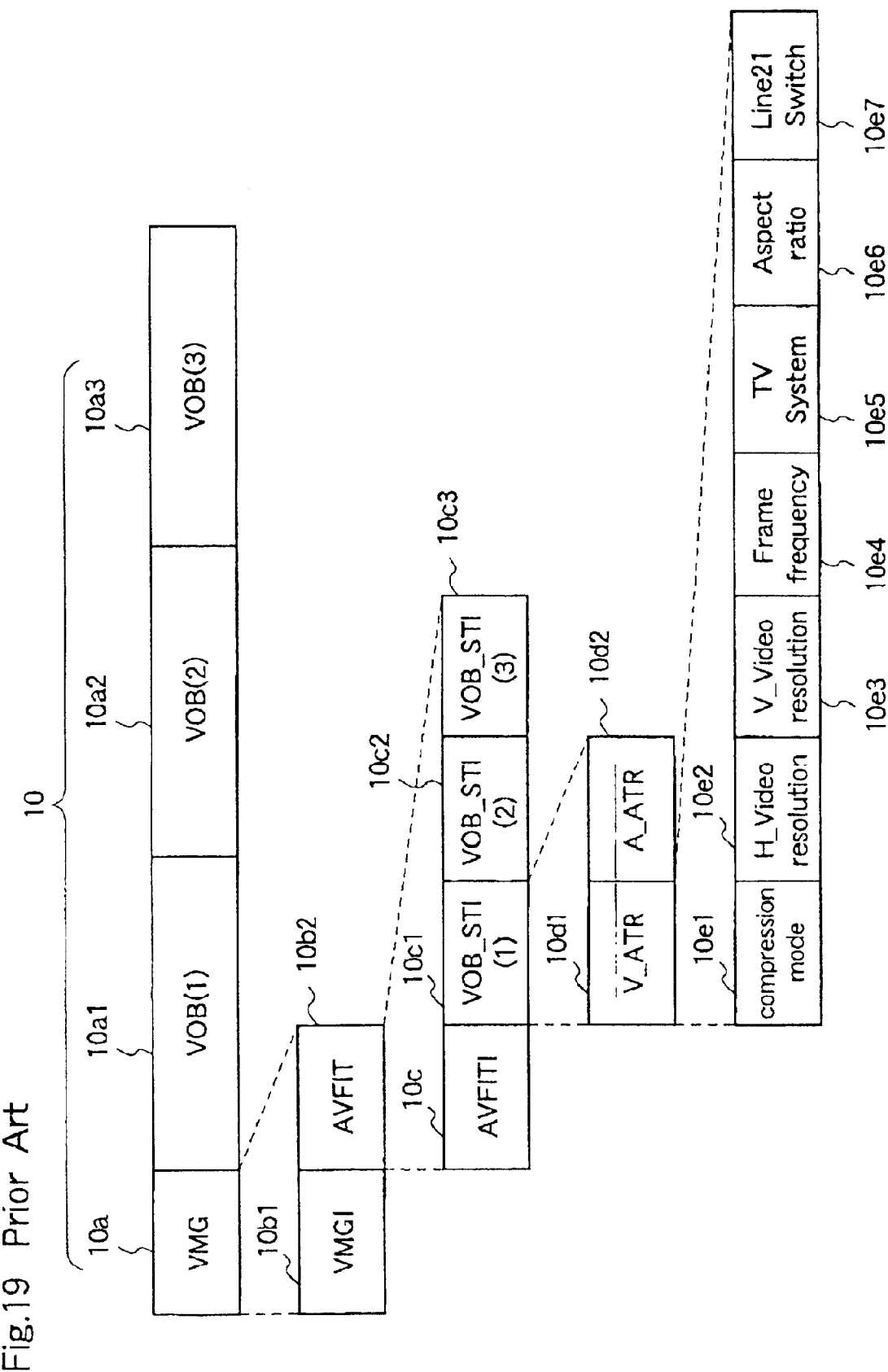
FIG. 19 is a diagram for explaining another recording format employed when recording an audio video stream on a recording medium, and illustrates video attribute information in detail.
Figure 20:
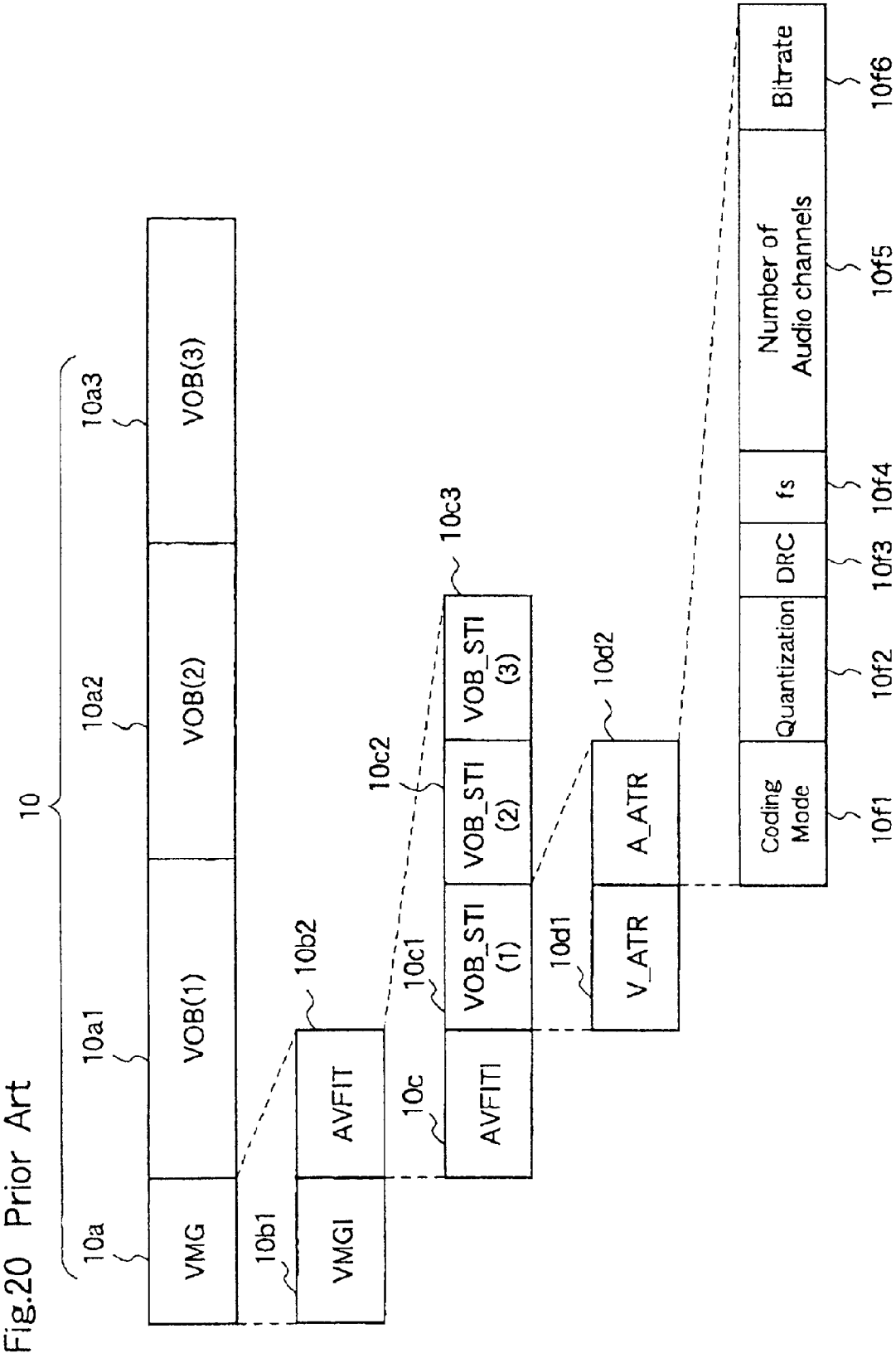
FIG. 20 is a diagram for explaining a recording format employed when recording an audio video stream on a recording medium, and illustrates audio attribute information in detail.

In the VMG generator 110, VMG information Dvmg, which is management information for each VOB, is generated on the basis of the video attribute information Dva, the audio attribute information Daa, and the specific address information Isa. This VMG information Dvmg is subjected to addition of error correcting code and recording modulation by the recording signal processor 109, whereby a recording signal Sre corresponding to the VMG information Dvmg is generated. This recording signal Sre is written in the optical disk 106 by the recording head 105. The recording signal Sre corresponding to the VMG information Dvmg is written in a predetermined recording area of the recording medium 106 after recording of the recording signal Sre corresponding to the VOB data Dvob is completed. At this time, the specific address information is a is written in the recording area corresponding to the VMGI 10b1 (see FIG. 19). Further, the video attribute data Dva and the audio attribute data Daa are written in the V_ATR 10d1 and the A_ATR 10d2 in the VMG information 10a, respectively (see FIG. 19).

As described above, the recording apparatus 100a according to the first embodiment of the invention is provided with the video attribute detector 107 for detecting the video attribute, the audio attribute detector 109 for detecting the audio attribute, and the address information generator 108 for generating the specific address information Isa which indicates the wrote address at the time when the attribute change occurs, on the basis of the outputs from these detectors 107 and 109. The specific address information Isa is written in the recording area of the optical disk 106 corresponding to the VMGI 10b1 which is a component of the management information (VMG information) 10a of each VOB. Therefore, when playing the audio video stream recorded on the optical disk 106, the recording position in the audio video stream, at which the attribute change occurs, can be recognized by reading the VMG information 10a, whereby quick access can be made to the recording position in the stream where the attribute change occurs on the optical disk.

While in this first embodiment the specific address information Isa indicating the date write address at the point of time when the video attribute or the audio attribute changes is written on the recording medium, information relating to the recording time based on a reference time, at which the video attribute or the audio attribute changes, may be recorded on the recording medium instead of the specific address information Isa.

[Embodiment 2]

Figure 2:
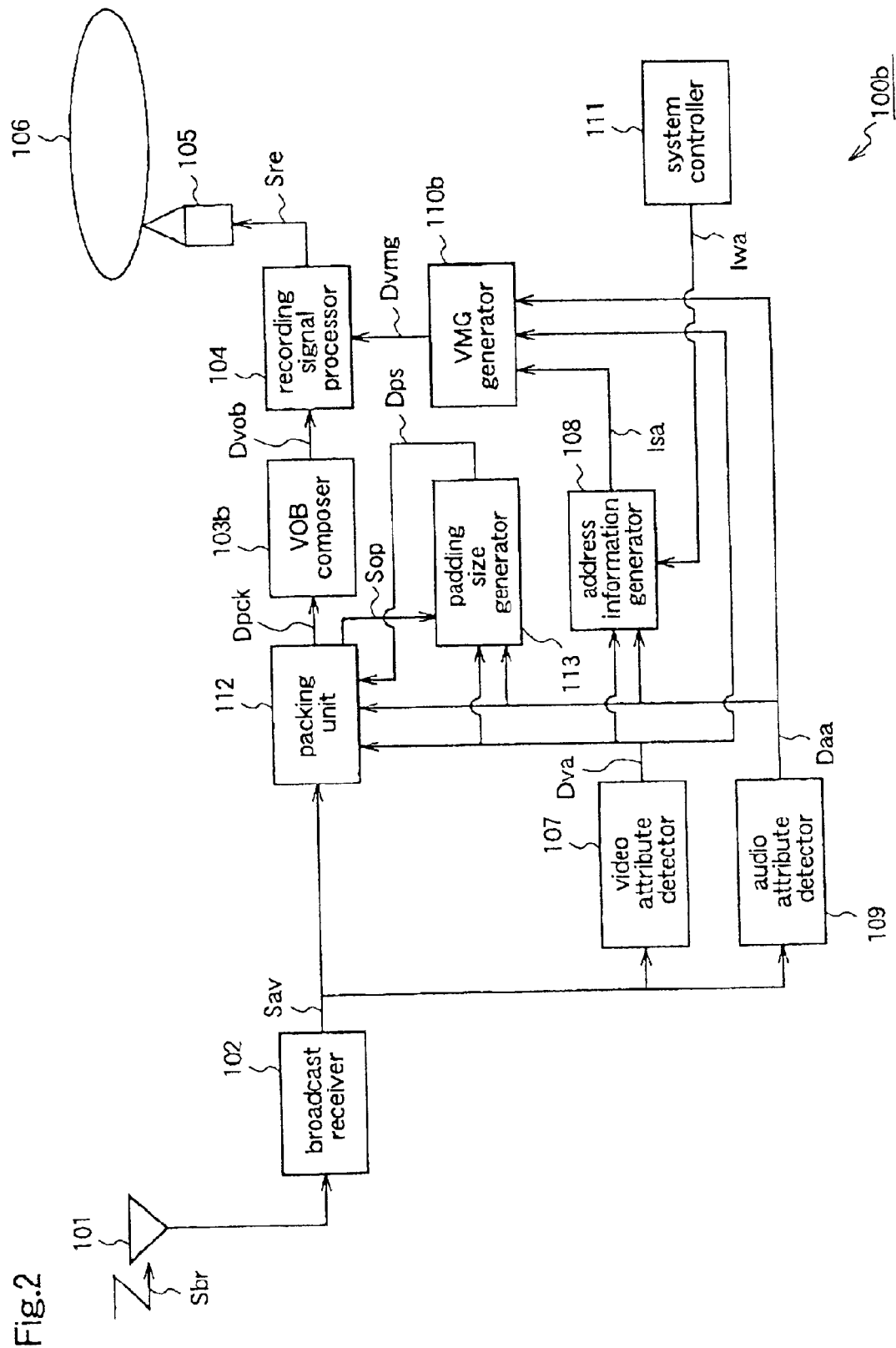
FIG. 2 is a block diagram for explaining a recording apparatus according to a second embodiment of the present invention.

FIG. 2 is a block diagram for explaining a recording apparatus 100b according to a second embodiment of the present invention.

The recording apparatus 100b of this second embodiment includes a packing unit 112 and a padding size generator 113, instead of the packing unit of the first embodiment. The packing unit 112 performs the same packing process as described for the first embodiment. Further, when the audio attribute or the video attribute changes, the packing unit 112 inserts padding data in the pack which is being formed, following the stream just before the attribute change, to prevent the stream before the attribute change and the stream after the attribute change from being stored in one pack. The padding size generator 113 calculates the size of the padding data on the basis of the video attribute data Dva, the audio attribute data Daa, and an internal signal Sop of the packing unit 112, and outputs size information Dps indicating the size to the packing unit 112. The padding data is also called stuffing data.

Other constituents of the recording apparatus 100b are identical to those already described for the recording apparatus 100a of the first embodiment.

Reference numeral 103b denotes a VOB composer according to this second embodiment, and the VOB composer 103b converts the PCK data Dpck from the packing unit 112 into VOB data Dvob according to the format of the video standard.

Next, the operation of the recording apparatus 100b will be described.

The audio video stream Sav supplied from the broadcast receiver 102 is divided into plural streams corresponding to data units (first data units) each having a predetermined data size by the packing unit 112, and PCK data Dpck corresponding to each stream (pack) is output to the VOB composer 103b. At this time, the audio stream is output as audio PCK data thereinafter also re erred to simply as "audio pack"), and the video stream is output as video PCK data (hereinafter also referred to simply as "video pack").

In the VOB composer 103, a predetermined number of audio packs and, video packs equivalent to a predetermined display time are put together as a VOBU (third data unit). Then, VOB data Dvob, which comprises a plurality of VOBUs equivalent to the audio video stream Sav inputted from the start of recording to the end of recording, is generated.

The VOB data Dvob is converted into a recording signal Sre by the recording signal processor 104, and recorded on the recording medium 106 by the optical head 105 according to the write address Iwa.

Further, the video attribute detector 107 detects the video attribute to output the video attribute data Dva, and the audio attribute detector 109 detects the audio attribute and to output the audio attribute data Daa.

In the address information generator 10B, specific address information Isa indicating the write address at the time when the audio attribute or the video attribute changes is generated on the basis of the video attribute data Dva, the audio attribute data Daa, and the write address information iwa.

The padding size generator 113 receives the video attribute data Dva, the audio attribute data Daa, and the internal signal Sop indicating the packing state in the packing unit 112. When the video attribute or the audio attribute changes, the padding size generator 113 calculates the size of padding data, and outputs the size information Dps indicating the data size. To be specific, when the packing unit 112 detects an attribute change while storing the stream (video stream or audio stream) in a specific pack, the padding size generator 113 calculates the vacant space of this pack at this point of time as the size of padding data.

When the data size information Dps is input to the packing unit 112, padding data is inserted in the vacant space of the specific pack, by an amount indicated by the size information Dps, instead of a portion of the stream after the position where the attribute change occurs. Thereby, even when the attribute change occurs during formation of the specific pack, the stream after the attribute change is not stored in this pack together with thee stream before the attribute change. In other words, wherein the attribute change occurs, the stream before the attribute change and the stream after the attribute change are stored in adjacent different packs, respectively. To be specific, the stream after the attribute change is stored, from its beginning, in a pack which follows the specific pack.

Thereafter, the same processes as those already described for the first embodiment are carried out and, finally, the recording signal Sre corresponding to the VMG information Dvmb of each VOB is recorded on the recording medium 106.

As described above, the recording apparatus 100b of this second embodiment is provided with, instead of the packing unit of the first embodiment, the packing unit 112 for inserting padding data in the pack currently being formed when the audio attribute or the video attribute changes, and the padding size generator 113 which calculates the size of the padding data. In this recording apparatus 100b, when the attribute changes, padding data is inserted in the pack under formation, instead of the stream after the attribute change. Therefore, the stream is recorded such that the head of the stream, after the attribute change is matched to the head of the pack.

Accordingly, when playing the audio video stream recorded on the optical disk 106, it is possible to recognize the recording position corresponding to the portion where the video or audio attribute changes, in the audio video stream whose recording addresses are managed in pack units, by reading the VMG information 10a, whereby quick access can be made to the recording position of the stream where the attribute change occurs, on the optical disk.

While in this second embodiment the predetermined position of the stream and the head position of the pack are matched to each other by inserting the padding data in the pack, the method of matching the predetermined position of the stream to the head position of the pack is not restricted thereto. For example, the size information of the pack data written in the pack header or the like may be changed.

Further, in the first and second embodiments, both of the video attribute and the audio attribute are detected, and the specific address information Isa is generated according to changes in these attributes. However, only one of the video attribute and the audio attribute may be detected, and the specific address information Isa may be generated according to a change in the detected attribute.

[Embodiment 3]

Figure 3:
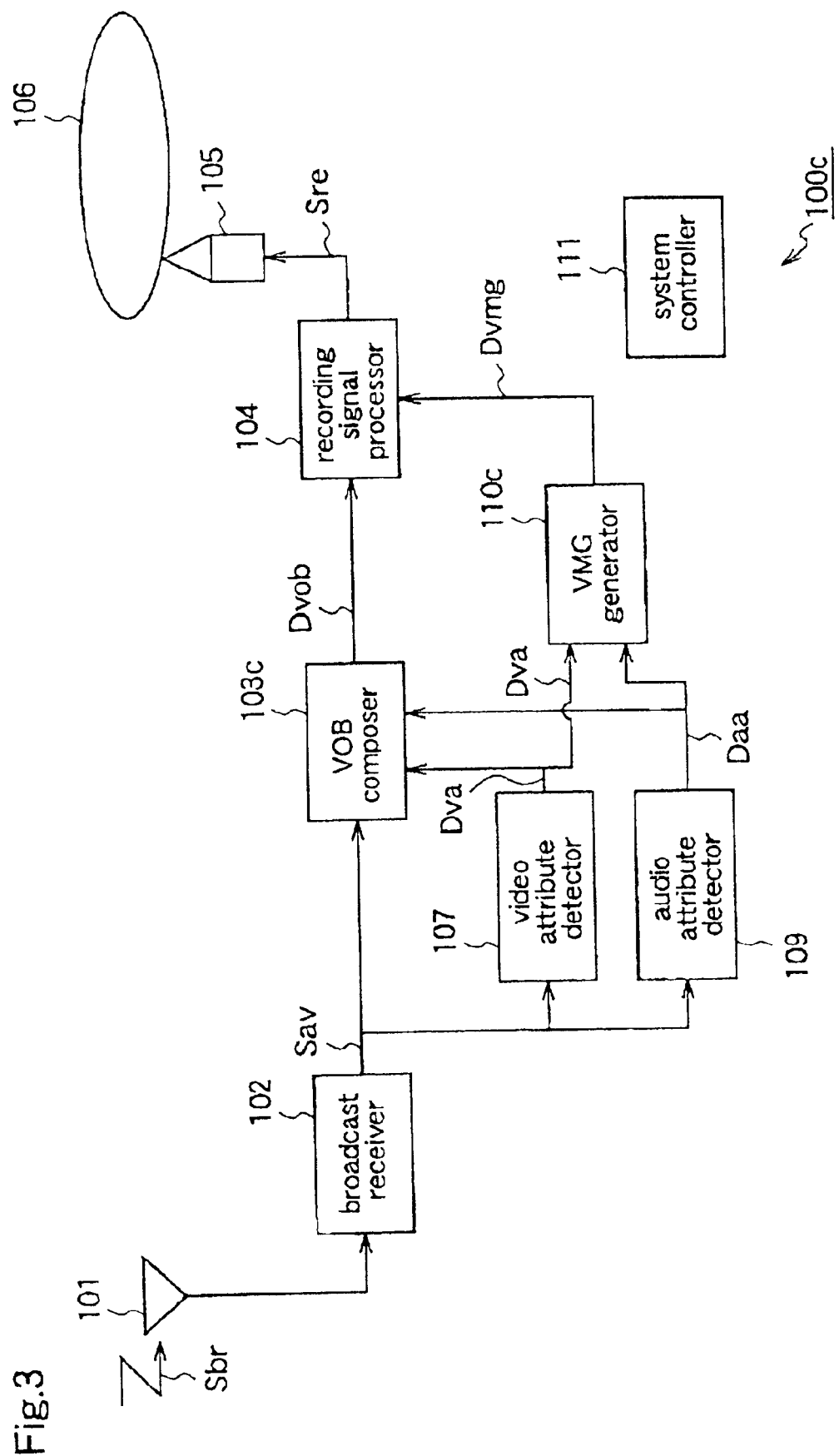
FIG. 3 is a block diagram for explaining a recording apparatus according to a third embodiment of the present invention.

FIG. 3 is a black diagram for explaining a recording apparatus 100c according to a third embodiment of the present invention.

This recording apparatus 100c includes a VMG generator 110c instead of the address information generator 108 and the VMG generator 110 of the first embodiment. The VMG, generator 110c generates VMG information Dvmg, which is management information for each VOB, on the basis of the video attribute data Dva and the audio attribute data Daa supplied from the attribute detectors 107 and 109, respectively.

The recording apparatus 100c further includes a VOB composer 103c instead of the VOB composer 103 of the first embodiment. When either the audio attribute or the video attribute changes, the VOB composer 103c generates VOB data so that the stream before the attribute change and the stream after the attribute change are separated as different VOB data, on the basis of the video attribute data Dva and the audio attribute data Daa.

Other constituents of the recording apparatus 100c are identical to those already described for the recording apparatus 100a of the first embodiment.

Hereinafter, the operation of the recording apparatus 100c will be described.

In this third embodiment, the broadcast signal Sbr from the antenna 101 is received by the broadcast receiver 102, and the audio video stream Sav from the receiver 102 is input to the VOB composer 103c, the video attribute detector 107, and the audio attribute detector 109. In the VOB composer 103c, the audio video stream Sav is converted to VOB data Dvob (see figures 21(a) & (b) and 22(a) & (b)) according to the format of the DVD recording standard. This VOB data Dvob is converted to a recording signal Sre by the recording signal processor 104, and the recording signal Sre is written in the optical disk 106 by the recording head 105.

Further, in the video attribute detector 107, the video attribute is detected on the basis of the audio video stream Sav, and the video attribute data Dva is output to the VOB composer 103c and the VMG generator 110. In the audio attribute detector 109, the audio attribute is detected on the basis of the audio video stream Sav, and the audio attribute data Daa is output to the VOB composer 103c and the VMG generator 110.

The receiver 102, the VOB composer 103c, the recording signal processor 104, the recording head 105, and the attribute detectors 107 and 109 operate in the same way; as described for the first embodiment.

In this third embodiment, when the video attribute or the audio attribute changes during recording of the audio video stream Sav, the VOB composer 103c forms VOB data corresponding to the audio video stream Sav such that the stream before the attribute change and the stream after the attribute change are separated as different VOB data.

In the VMG generator 110c, VMG information Dvmg as management information for recorded VOB data is generated, and the VMG information Dvmg is output to the recording signal processor 104. In the processor 104, the VMG information Dvmg is subjected to addition of error correcting code and to recording modulation, thereby generating a recording signal Sre corresponding to the VMG information Dvmg. The recording signal Sre is recorded on the optical disk 106 by the optical head 105.

Figure 18:
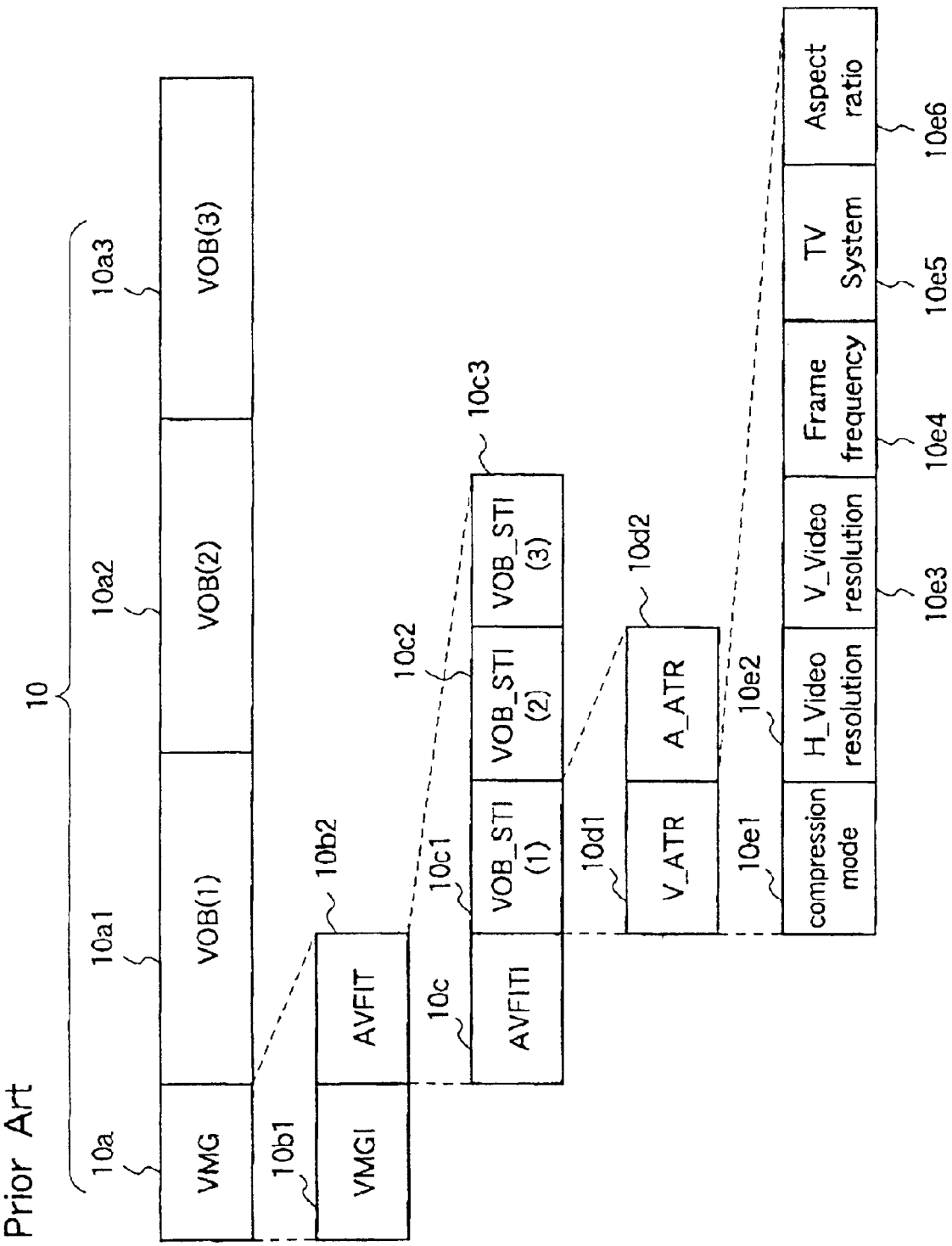
FIG. 18 is a diagram for explaining a recording format employed when recording an audio video stream on a recording medium, and illustrates video attribute information in detail.

As shown in FIG. 18, the VMG information Dvmg includes, as management information for each VOB, recording start address information, search information, video attribute information, and audio attribute information. The search information is information for searching a predetermined position in the recorded audio video stream.

As described above, the recording apparatus 100c of this third embodiment is provided with the VOB composer 103c which generates VOB data such that, when either the audio attribute or the video attribute changes, the stream before the attribute change and the stream after the attribute charge are separated as different VOB data. Therefore, the video attribute and the audio attribute can be unified for one VOB data. Accordingly, when playing the signal recorded on the optical disk 106, each VOB data can be decoded on the basis of the video attribute and the audio attribute which are managed in VOB units.

Further, when playing the audio video stream, quick access can be made to the recording position where the attribute change occurs, in the stream recorded on the optical disk, by reading the VMG information Dvmg.

Further, in this third embodiment, both of the video attribute and the audio attribute are detected, and the VOB data is generated according to changes in these attributes. However, only one of the video attribute and the audio attribute may be detected, and the VOB data may be generated according to a change in the detected attribute.

[Embodiment 4]

Figure 4:
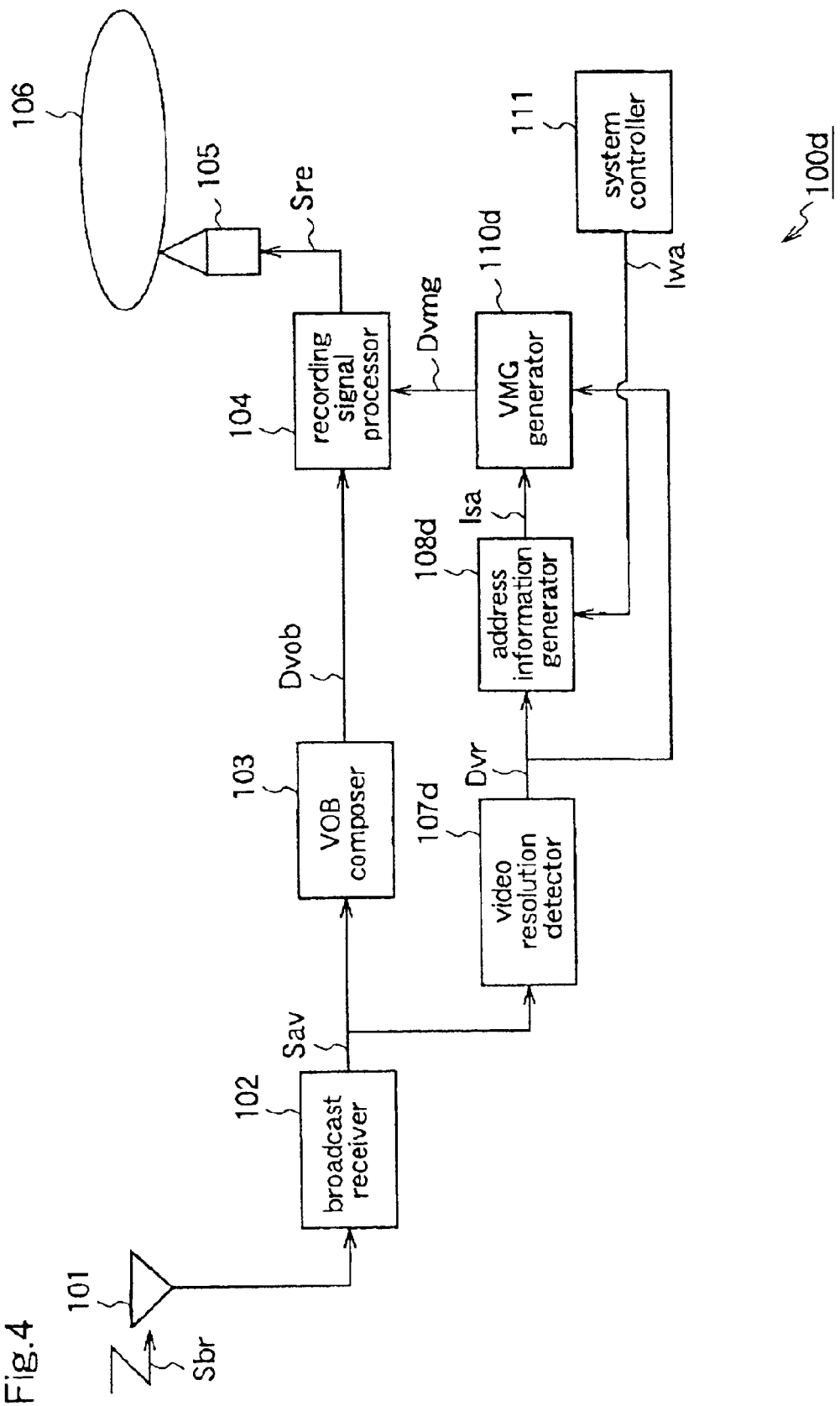
FIG. 4 is a block diagram for explaining a recording apparatus according to a fourth embodiment of the present invention.

FIG. 4 is a block diagram for explaining a recording apparatus 100d according to a fourth embodiment of the present invention.

Like the recording apparatus 10a of the first embodiment, the recording apparatus 100d receives a digital broadcast signal Sbr, and records an audio video stream Sav obtained from she digital broadcast signal Sbr on a recording medium according to the format of the DVD recording standard.

To be specific, the recording apparatus 100d includes a broadcast receiver 102 for receiving a digital broadcast signal Sbr from an antenna 101, and outputting an audio video stream Sav; a VOB composer 103 for converting the audio video stream Sav into VOB data Dvob according to the format of the DVD recording standard; a recording signal processor 110 for subjecting the VOB data Dvob to addition of error correcting code and to recording modulation, and outputting a recording signal Sre corresponding to the VOB data; and a recording head 105 for writing the recording signal Sre on a recording medium 106. Further, in the recording apparatus load, a packing unit (not shown) for packing the audio video stream Sav is provided between the broadcast receiver 102 and the VOB composer 103, and the VOB composer 103 is supplied with PCK data as the audio video stream Sav.

The antenna 101, the receiver 102, the VOB composer 103, the recording signal processor 104, the recording head 105, the recording medium 106, and the packing unit (not shown) are identical to those described for the first embodiment.

The recording apparatus 100d further includes a video resolution detector 107d for receiving the audio video stream Sav, detecting the video resolution by analyzing the header information of the video stream included in the audio video stream Sav, and outputting data Dvr indicating the video resolution (video resolution data).

The video resolution detector 107d detects, as the video resolution, at least one of the horizontal resolution, vertical resolution, and time resolution (frame frequency).

The horizontal resolution indicates the frame size in the horizontal resolution, and information such as 352, 480, 544, 704, 720, 1440, or 1920 pixels is used as the frame size.

The vertical resolution indicates the frame size in the vertical resolution, and information such as 240, 480, 576, 720, or 1080 lines is used as the frame size.

The time resolution is indicated by the frame frequency, and a value such as 24, 30, 50, 59.97, or 60 Hz is used as the value of the frame frequency.

The video resolution detector 107d may detect, as the time resolution, that the audio video stream Sav corresponds to either an interlace signal or a progressive signal.

Further, the recording apparatus 100d includes a system controller 111 for generating write address information Iwa which indicates an address of a recording area in the recording medium 106 where the recording signal is to be written; an address information generator 108d for outputting specific address information Isa indicating the write address at the time when the video resolution changes, on the basis of the video resolution data Dvr and the write address information Iwa; and a VMG generator 110d for generating BEG information Dvmg that is management information for the VOB data, on the basis of the video resolution data Dvr from the detector 107d and the specific address information Isa from the address information generator 10B.

When the video resolution of the audio video stream Sav changes, the specific address information Isa indicating the write address at the time when the resolution change occurs, is stored in the VMG information Dvmg, as described for the first embodiment.

Next, the operation of the recording apparatus 100d will be described.

In this fourth embodiment, the broadcast signal Sbr from the antenna 101 is received by the broadcast receiver 102, and the audio video stream Sav from the receiver 102 is input to the VOB composer 103 through the packing unit (not shown). In the VOB composer 103, the audio video stream Sav is converted to VOB data Dvob (see FIGS. 21(a) & (b) and 22(a) & (b)) according to the format of the DVD recording standard. This VOB data Dvob is converted to a recording signal Sre by the recording signal processor 104, and the recording signal Sre is written in the optical disk 106 by the recording head 105.

The receiver 102, the VOB composer 103, the recording signal processor 104, the recording head 105, and the packing unit (rot shown) operate in the same way as described for the first embodiment.

In the video resolution detector 107d, the video resolution is detected on the basis of the audio video stream Sav from the receiver 102, and video resolution data Dvr is output to the address information generator 108d and the VMG generator 110d.

Further, in the system controller ill, the write address information Iwa for the data is generated. In the address information generator 108d, when the video resolution changes, the specific address information Isa indicating the write address at the time when the video the resolution change occurs, is output to the VMG generator 110d, on the basis of the output from the detector 107d and the write address information Iwa.

In the VMG generator 110d, the VMG information Dvmg as management information for each VOB is generated on the basis of the video resolution data Dvr and the output from the address information generator 108d. This VMG information Dvmg is subjected to addition of error correcting code and to recording modulation by the recording signal processor 104, thereby generating a recording signal Sre corresponding to the VMG information Dvmg. This recording signal Sre is written in the optical disk 106 by the recording head 105.

The recording signal Sre corresponding to the VMG information Dvmg is written in a predetermined recording area of the recording medium 106 after recording of the recording signal Sre corresponding to the VOB data Dvob is completed. At this time, the specific address information Isa is written as search information in the recording area corresponding to the VMGI 10b1 (see FIG. 19). Further, the video resolution data Dvr is recorded in the V_ATR 10d1 in the VMG information 10a (see FIG. 19).

As described above, the recording apparatus 100d according to the fourth embodiment of the invention is provided with the video resolution detector 107d for detecting the video resolution, and the address information generator 108d for generating the specific address information Isa which indicates the data write address at the time when the video resolution changes, on the basis of the output from the detector 107d. The specific address information Isa is stored in the VMGI 10b1 which is a component of the management information (VMG information) 10a of each VOB. Therefore, when playing the audio video stream recorded on the optical disk 106, the recording position corresponding to the portion of the audio video stream where the video resolution changes can be recognized by reading the VMG information 10a, and this enables quick access to the position in the recorded stream where the video resolution changes.

[Embodiment 5]

Figure 5:
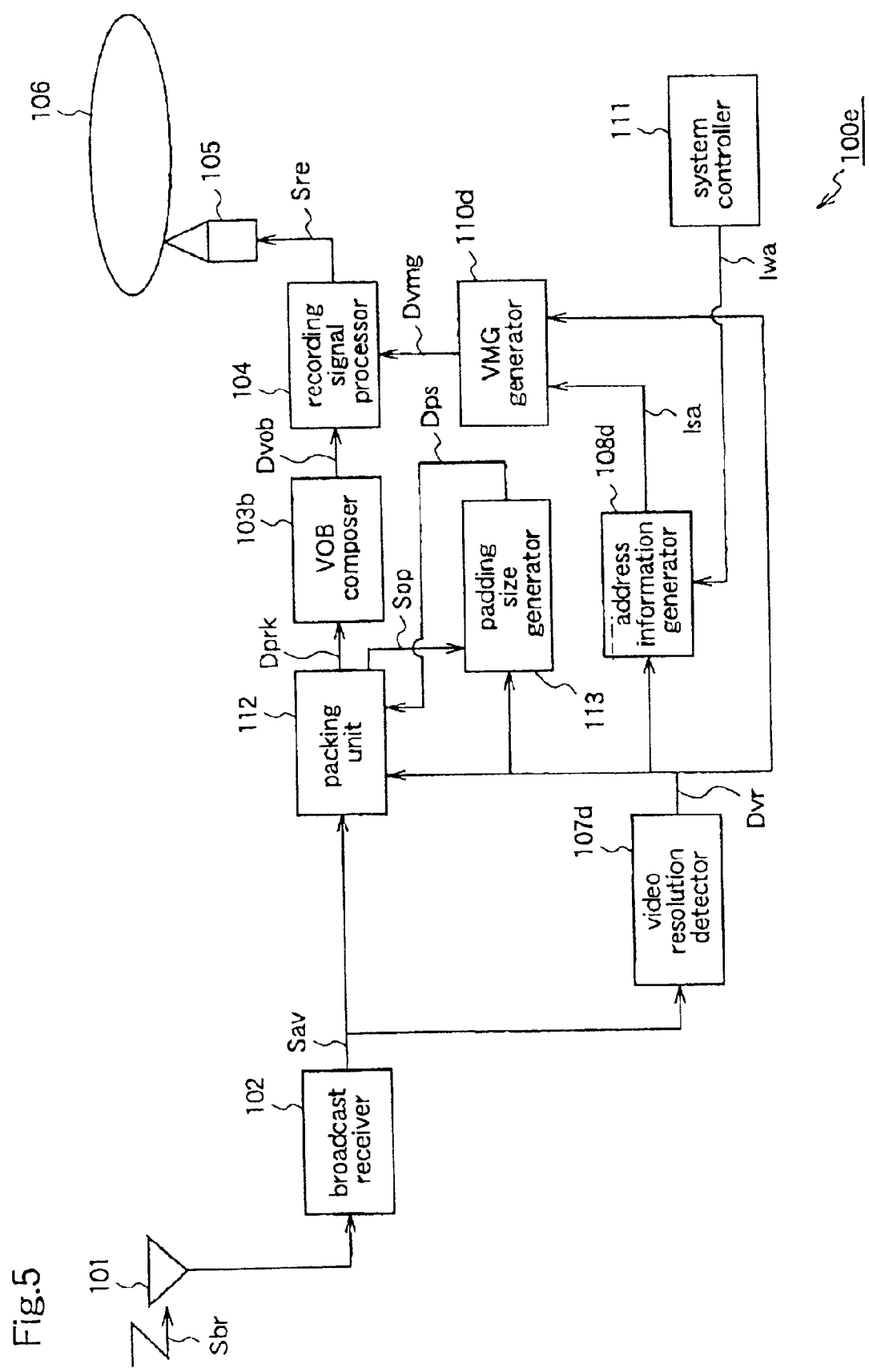
FIG. 5 is a block diagram for explaining a recording apparatus according to a fifth embodiment of the present invention.

FIG. 5 is a block diagram for explaining a recording apparatus 100e according to a fifth embodiment of the present invention.

The recording apparatus 100e of this fifth embodiment includes a packing unit 112 and a padding size generator 113, instead of the packing unit (not shown) of the recording apparatus 100d according to the fourth embodiment. The packing unit 112 performs the same packing process as described for the first embodiment. Further, when the video resolution changes, the packing unit 112 inserts padding data in the pack which is being formed at this time, following the stream just before the resolution change, to prevent the stream before the resolution change and the stream after the resolution change from being stored in one pack. The padding size generator 113 calculates the size of the padding data on the basis of the video resolution data Dvr and an internal signal Sop from the packing unit 112, and outputs size information Dsp indicating this size to the packing unit 112.

Other constituents of the recording apparatus 100e are identical to those already described for the recording apparatus 100d of the fourth embodiment.

Reference numeral 103b denotes a VOB composer according to this fifth embodiment, and this VOB composer 103b converts the PCK data Dpck from the packing unit 112 into VOB data Dvob according to the format of the DVD recording standard, like the VOB composer 103 according to the fourth embodiment.

Next, the operation of the recording apparatus 100e will be described.

When the audio video stream Sav supplied from the broadcast receiver 102 is input to the packing unit 112, it is divided into plural streams corresponding to data units (first data units) each having a predetermined data size, and PCK data Dpck corresponding to each stream (pack) is output to the VOB composer 103b. At this time, the audio stream is output as audio PCK data (audio pack), and the video stream is output as video PCK data (video pack).

In the VOB composer 103b, a predetermined number of audio packs and video packs equivalent to a predetermined display time are put together as a VOBU (third data unit). Then, VOB data Dvob, which comprises a plurality of VOBUs equivalent to the audio video stream Sav inputted from the start of recording to the end of recording, is generated.

The VOB data Dvob is converted into a recording signal Sre by the recording signal processor 104, and the recording signal Sre is recorded on the recording medium 106 by the optical head 105 according to the write address Iwa.

In the video resolution detector 107d, the video resolution is detected, and the video resolution data Dvr is output. In the address information generator 108d, specific address information Isa indicating the where address at the time when the video resolution changes is generated on the basis of the video resolution data Dvr and the write address information Iwa.

The padding size generator 113 receives the video resolution data Dvr and the internal signal Sop indicating the packing state in the packing unit 112. When the video resolution changes, the padding size generator 113 calculates the size of padding data, and outputs information Dps (size information) indicating the data size. To be specific, when the resolution change is detected while the stream (video stream or audio stream) is being stored in a specific packs by the pack-ng unit 112, the vacant space of the pack at this point of time is calculated as the size of padding data.

When the data size information Dps is input to the packing unit 112, padding data is inserted in the vacant space of the pack, by an amount indicated by the size information Dps, instead of a portion of the stream after the position where the resolution change occurs. Therefore, even when the resolution change occurs during formation of the specific pack, the stream after the resolution change is nor stored in this pack together with the stream before the resolution change. In other words, when the resolution change occurs, the stream before the resolution change and the stream after the resolution change are stored in adjacent different packs, respectively. That is, the stream after the resolution change is stored; from its beginning, in a pack which follows the specific pack.

Thereafter, the recording apparatus 100e operates in the same way as described for the recording apparatus 100d of the fourth embodiment, and the recording signal Sre corresponding to the VMG information Dvmg of each VOB is recorded on the recording medium 106.

As described above, the recording apparatus 100e of this fifth embodiment is provided with, instead of the packing unit of the fourth embodiment, the packing unit 112 for inserting padding data in the pack under formation when the video resolution changes, and the padding size generator 113 for calculating the size of the padding data. When the resolution changes, the padding data is inserted in the pack under formation, instead of the stream after the resolution change. Therefore, the stream is recorded such that the head of the stream after the resolution change is matched to the head of the pack.

Accordingly, when playing the audio video stream recorded or, the optical disk 106, the recording position corresponding to the portion where the resolution changes, in the audio video stream whose recording addresses are managed in pack units, can be recognized by reading the VMG information 10a, and this enables quick access to the recording position of the audio video stream where the resolution change occurs on the optical disk.

While in this fifth embodiment the predetermined position or the stream and the head position of the pack are matched to each other by inserting padding data in the pack, the method of matching the predetermined position of the stream to the head position of the pack is not restricted thereto. For example, the size information or the pack data written in the pack header or the like may be changed.

[Embodiment 6]

Figure 6:
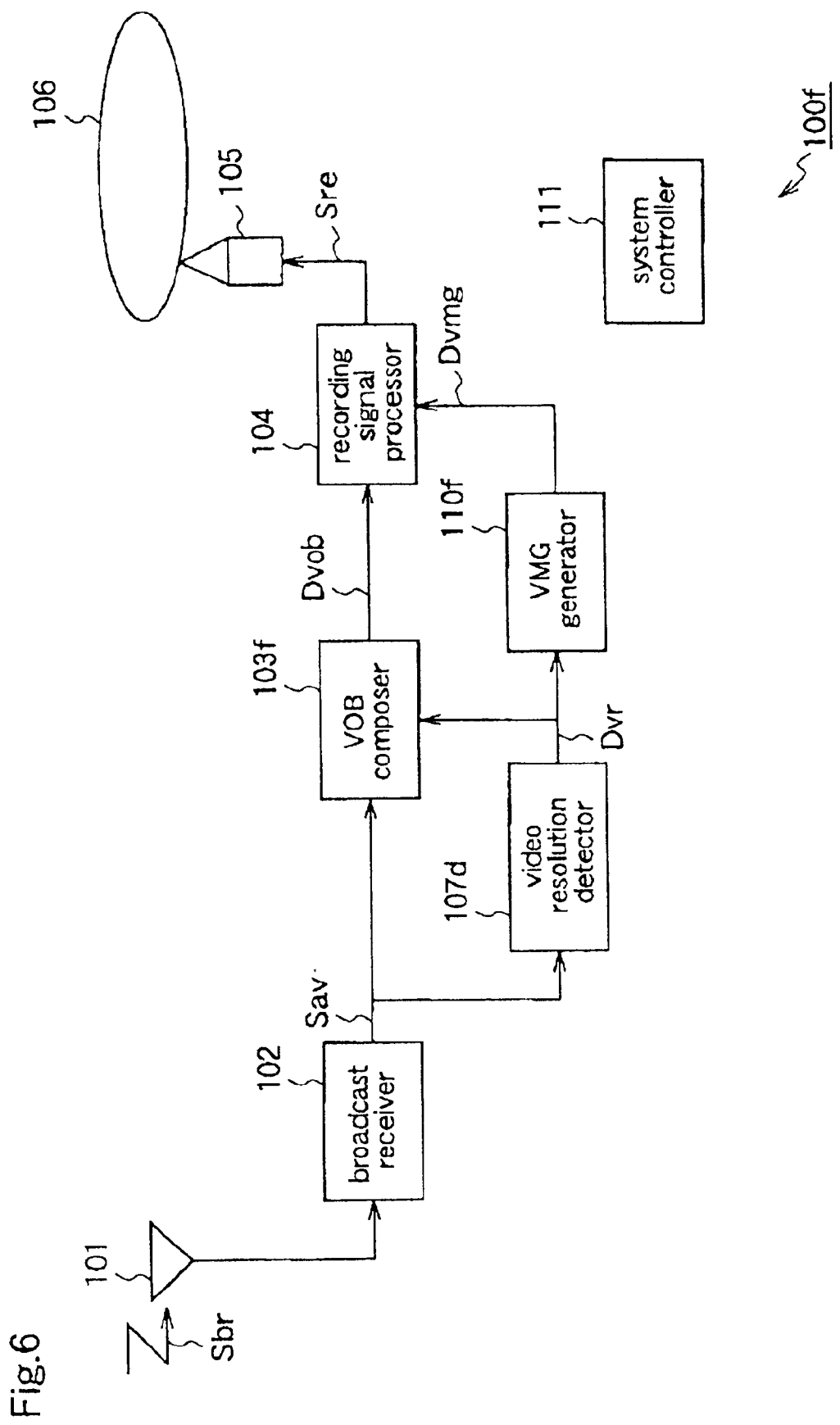
FIG. 6 is a block diagram for explain ing a recording apparatus according to a sixth embodiment of the present invention.

FIG. 6 is a block diagram for explaining a recording apparatus 100f according to a sixth embodiment of the present invention.

This recording apparatus 100f includes a VMG generator 110f instead or the address information generator 108d and the VMG generator 100d of the fourth embodiment. The VMG generator 110f generates VMG information Dvmg which is management information for each VOB, on the basis of the video resolution data Dvr from the resolution detector 107d.

The recording apparatus 10f further includes a VOB composer 103f instead of the VOB composer 103 of the fourth embodiment. When the video resolution changes, the VOB composer 103f generates VOB data so that the stream before the resolution change and the stream after the resolution change are separated as different VOB data, on the basis of the video resolution data Dvr.

Other constituents of the recording apparatus 100f are identical to those already described for the recording apparatus 100d of the fourth embodiment.

Hereinafter, the operation of the recording apparatus 100f will be described.

In this fifth embodiment, the broadcast signal Sbr from the antenna 101 is received by the broadcast receiver 102, and the audio video stream Sav from the receiver 102 is input to the VOB composer 103f and the video resolution detector 107d. In the VOB composer 103f, the audio video stream Sav is converted to VOB data Dvob (see FIGS. 21(a)&(b) and 22(a)&(b)) according to the format of the DVD recording standard. This VOB data Dvob is converted to a recording signal Sre by the recording signal processor 104, and the recording signal Sre is written in the optical disk 106 by the recording head 105.

Further, in the video resolution detector 107d, the video resolution is detected on the basis of the audio video stream Sav, and the video resolution data Dva is output to the VOB composer 103f and the VMG generator 110f.

The receiver 102, the VOB composer 103f, the recording signal processor 104, the recording head 105, and the video resolution detector 103d operate in the same way as described for the fourth embodiment.

In this sixth embodiment, when the video resolution changes during recording of the audio video stream Sav, the VOB composer 103f forms VOB data Dvob corresponding to the audio video stream Sav such that the stream before the resolution change and the stream after the resolution change are separated as different VOB data.

In the VMG generator 110f, VMG information Dvmg which is management information for recorded VOB data is generated, and the VMG information Dvmg is output to the recording signal Processor 104. In the processor 104, the VMG information Dvmg is subjected to addition of error correcting code and to recording modulation, thereby generating a recording signal Sre corresponding to the VMG information Dvmg. She recording signal Sre is recorded on the optical disk 106 by the optical head 105.

As shown in FIG. 18, the VMG information Dvmg includes, as management information for each VOB, recording start address information, search information, video attribute information such as video resolution information, and audio attribute information.

As described above, the recording apparatus 100f of this sixth embodiment is provided with the VOB composer 103f which generates VOB data so that, when the video resolution changes, the stream before the resolution change and the stream after the resolution change are separated as different VOB data. Therefore, the video resolution can be unified for one VOB data. Accordingly, when playing the signal recorded on the optical disk 106, decoding of each VOB can be performed or, the basis of the video resolution which is managed in VOB units.

Further, when playing the audio video stream recorded on the optical disk, reading the VMG information Dvmg enables quick access to the recording position in the stream where the resolution change occurs.

[Embodiment 7]

Figure 7:
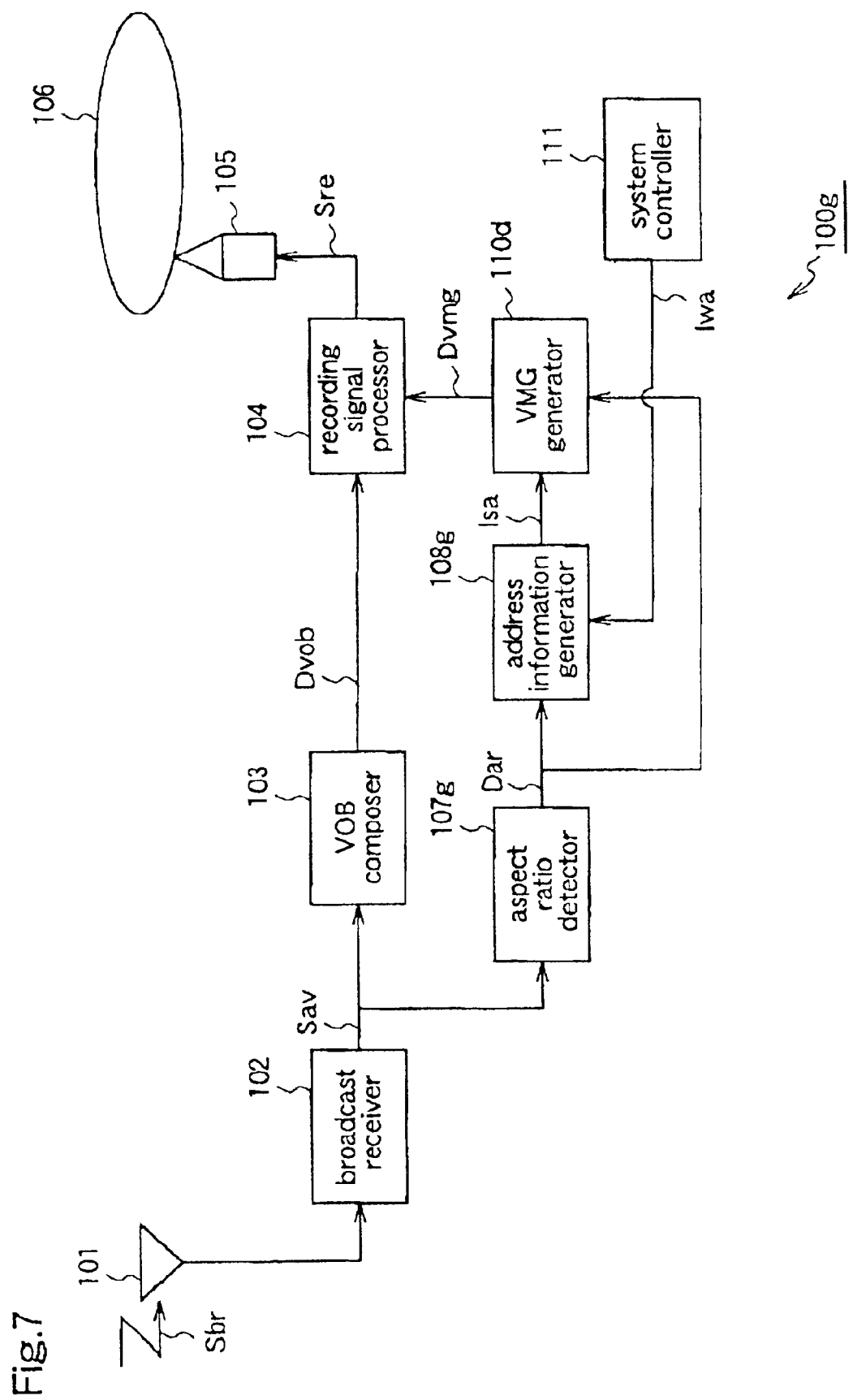
FIG. 7 is a block diagram for explaining a recording apparatus according to a seventh embodiment of the present invention.

FIG. 7 is a block diagram for explaining a recording apparatus 100a according to a seventh embodiment of the present invention.

The recording apparatus 100g includes an aspect ratio detector 107g and an address information generator 108g instead of the video resolution detector 107d and the address information generator 108d according to the fourth embodiment, respectively. The aspect ratio detector 107g receives an audio video stream Sav, detects the aspect ratio of the video stream included in the audio video stream Sav by analyzing the header information of the video stream, and outputs data Dar indicating the aspect ratio. The address information generator 108g generates specific address information is a indicating the write address at the time when the aspect ratio changes, on the basis of the output Dar form the detector 107g and the write address information Iwa from the system controller 111. The specific address information Isa and the aspect ratio data Dar are output to the VMG generator 110d. Other constitutents of the recording apparatus 100g are identical to those of the recording apparatus 100d according to the fourth embodiment.

The aspect ration detector 107g detects, as the aspect ratio, a ratio such as 16:9 or 4:3, the type of letter box, or the like.

Next, the operation of the recording apparatus 100g will be described.

In this seventh embodiment, as in the fourth embodiment, the broadcast signal Sbr is received by the broadcast receiver 102, and the audio video stream Sav outputted from the receiver 102 is input to the VOB composer 103 through the packing unit (not shown). Further, the VOB data Dvob from the VOP composer 103 is converted to a recording signal Sre by the recording signal processor 104, and the recording signal Sre is written in the optical disk 106 by the recording head 105.

The receiver 102, the VOB composer 103, the packing unit (not shown), the VOB composer 103, the recording signal processor 104, and the recording head 105 operate in the same way as described for the fourth embodiment.

In this seventh embodiment, in the aspect ratio detector 107g, the aspect ratio data Dar indicating the aspect ratio of the video frame is detected by analyzing the header of the video stream included in the audio video stream Sav, and the aspect ratio data Dar is output to the address information generator 108g and the VMG generator 110d.

Further, in the address information generator 108g, when the aspect rat-o changes, the specific address information Isa indicating the write address at the time when the aspect ratio changes, is output to the VMG generator 110d, on the basis of the output Sar from the detector 107g and the write address information Iwa from the controller 111.

In the VMG generator 110d, the VMG information Dvmg that is management information for each VOB is generated on the basis of the output Dar from the aspect ratio detector 107g and the output Isa from the address information generator 108a. This VMG information Dvmg is subjected to addition of error correcting code and to recording modulation by the recording signal processor 104, thereby generating a recording signal Sre corresponding to the VMG information Dvmg. This recording signal Sre is written in the optical disk 106 by the recording read 105.

The recording signal Sre corresponding to the VMG information Dvmg is written in a predetermined recording area of the recording medium 106 after recording of the recording signal Sre corresponding to the VOB data Dvob is completed. At this time, the specific address information Isa is written as search information in the recording area corresponding to the VMGI 10b1 (see FIG. 19). Further, the aspect ratio data Car is recorded in the V. ATR 10d in the VMG information 10a (see FIG. 9).

As described above, the recording apparatus 100g according to the seventh embodiment of the invention is provided with the aspect ratio detector 107g for detecting the aspect ratio data Dar of the video frame, and the address information generator 108g for generating the specific address information Isa which indicates the data write address at the time when the aspect ratio changes, on the basis of the aspect ratio data Dar from the detector 107g. The specific address information Isa is written in the recording area of the optical disk 106 corresponding to the VMGI 10b1 which is a component of the management information (VMG information) 10a of each VOB. Therefore, when playing the audio video stream recorded on the optical disk 106, the recording position in the audio video stream at which the aspect ratio changes, can be recognized by reading the VMG information 10a, and this enables quick access to the position where the aspect ratio changes, ir the stream recorded on the optical disk.

[Embodiment 8]

Figure 8:
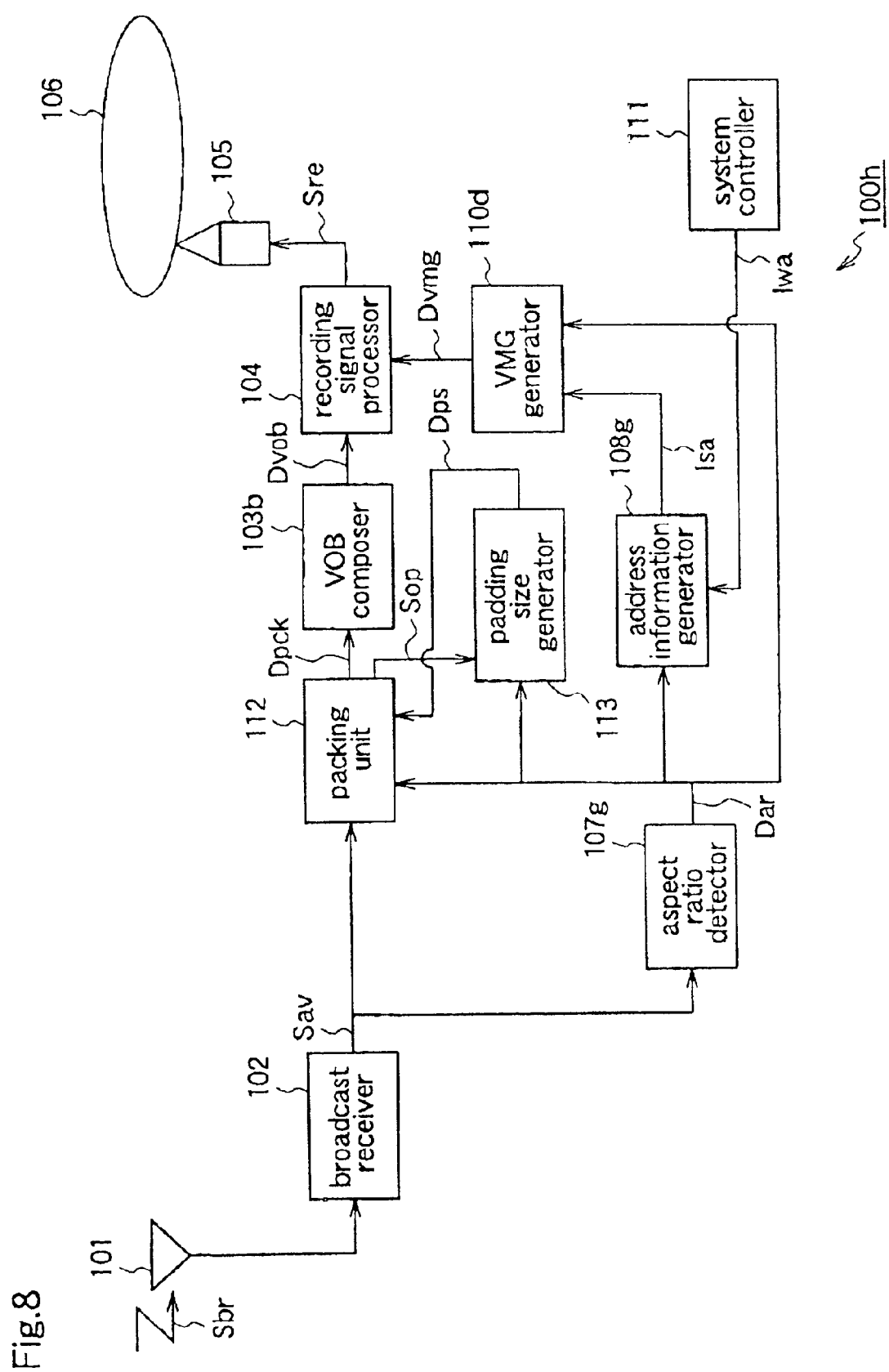
FIG. 8 is a block diagram for explaining a recording apparatus according to an eighth embodiment of the present invention.

FIG. 8 is a block diagram for explaining a recording apparatus 100h according to an eighth embodiment of the present invention.

The recording apparatus 100h of this eighth embodiment includes an aspect ratio detector 107g and an address information generator 108g instead of the video resolution detector 107d and the address information generator 108d according to the fifth embodiment. The aspect ratio detector 107g receives an audio video stream Sav, detects the aspect ratio of the video stream included in the audio video stream Sav by analyzing the header information of the video stream, and outputs data Dar indicating the aspect ratio. The address information generator 108d generates specific address information Isa indicating the write address at the time when the aspect ratio changes, on the basis of the output Dar from the detector 107g and the write address information Iwa from the system controller 111. The specific address information Tsa and the aspect ratio data Dar are output to the VMG generator 110d, and the aspect ratio data Dar is output to the packing unit 112 and the padding size generator 113. Other constituents of the recording apparatus 100g are identical to those of the recording apparatus 100e according to the fifth embodiment.

The aspect ratio detector 107g detects, as the aspect ratio, a ratio such as 16:9 or 4:3, the type of letter box, or the like.

Next, the operation of the recording apparatus 110h will be described.

In this eighth embodiment, the audio video stream Sav from the broadcast receiver 102 is input to the packing unit 112, wherein the stream Sva is divided into plural streams corresponding to data units (packs) each having a predetermined data size by the packing unit 112, and PCK data Dpck corresponding to each pack is output to the VOB composer 103b. In the VOB composer 103b, a predetermined number of PCK data Dpck equivalent to a predetermined display time are put together as a VOBU which is one data unit. Then, VOB data Dvob, which comprises a plurality of VOBUs equivalent to the audio video stream Sav inputted from the start of recording to the end of recording, is generated.

The VOB data Dvob is conversed into a recording signal Sre by the recording signal processor 104, and the recording signal Sre is recorded on the recording medium 106 by the optical head 105.

In the aspect ratio detector 107g, the aspect ratio data Dar is detected, and the video resolution data Dvr is output to the address information generator 108g, the padding size generator 113, and the packing unit 112.

In the address information generator 108g, specific address information. Is a indicating the write address at the time when the aspect ratio changes is generated on the basis of the aspect ratio data Dar and the write address information Iwa from the system controller 111.

When the aspect ratio changes, the padding size generator 113 calculates the size of padding data on the basis of the internal signal Sop indicating the packing state of the packing unit 112, and outputs size information Dps indicating the data size. To be specific, when the aspect ratio change is detected on the basis of the aspect ratio data Dar while the stream is being stored in a specific pack, the vacant space of this pack at this point of time is calculated as the size of padding data.

When the data size information Dps is input to the packing unit 112, padding data is inserted in the vacant space of the pack, by an amount indicated by the size information Dps, instead of a portion of the stream after the position where the aspect ratio changes. Therefore, even when the aspect ratio charges during formation of the specific pack, the stream after the aspect ratio change is not stored in this park together with the stream before the aspect ratio change. In other words, when the aspect ratio changes, the stream before the aspect ratio change and the stream after the aspect ratio change are stored in adjacent different packs, respectively. That is, the stream aster the aspect ratio charge is stored, from its beginning, in a pack which follows the specific pack.

Thereafter, the recording apparatus 100h operates in the same way as described for the recording apparatus 100e of the fifth embodiment, and the recording signal Sre corresponding to the VMG information Dvmg of each VOB is recorded on the recording medium 106.

The recording The recording signal Sre corresponding to the VMG data Dvmg is written in a predetermined recording area of the recording medium 106 after recording of the recording signal Sre corresponding to the VOB data Dvob is completed. At this time, the specific address information Isa is written as search information in the recording area corresponding to the VMGI 10b1 (see FIG. 19). Further, the aspect ratio data Dar is recorded in the V__ATR 10d1 in the VMG information 10a (see FIG. 19).

As described above, the recording apparatus 10h of this eighth embodiment is provided with the packing unit 112 which divides the audio video stream Sav into data units each having a predetermined data size. When the aspect ratio changes, padding data is inserted in the pack under formation, instead of the stream after the aspect ratio change. Therefore, the stream is recorded such that the head of the stream after the aspect ratio change is matched to the head of the pack.

Accordingly, when playing the audio video stream recorded on the optical disk 106, the recording position where the aspect ratio changes, in the audio video stream whose recording addresses are managed in pack units, can be recognized by reading the VMG information 10a, and this enables quick access to the position where the aspect ratio changes in the stream recorded on the optical disk.

While in this eighth embodiment the predetermined position of the stream and the head position of the pack are matched to each other by inserting padding data in the pack, the method of matching the predetermined position of the stream to the head position of the pack is not restricted thereto. For example, the size information of the pack data written in the pack header or the like may be changed.

[Embodiment 9]

Figure 9:
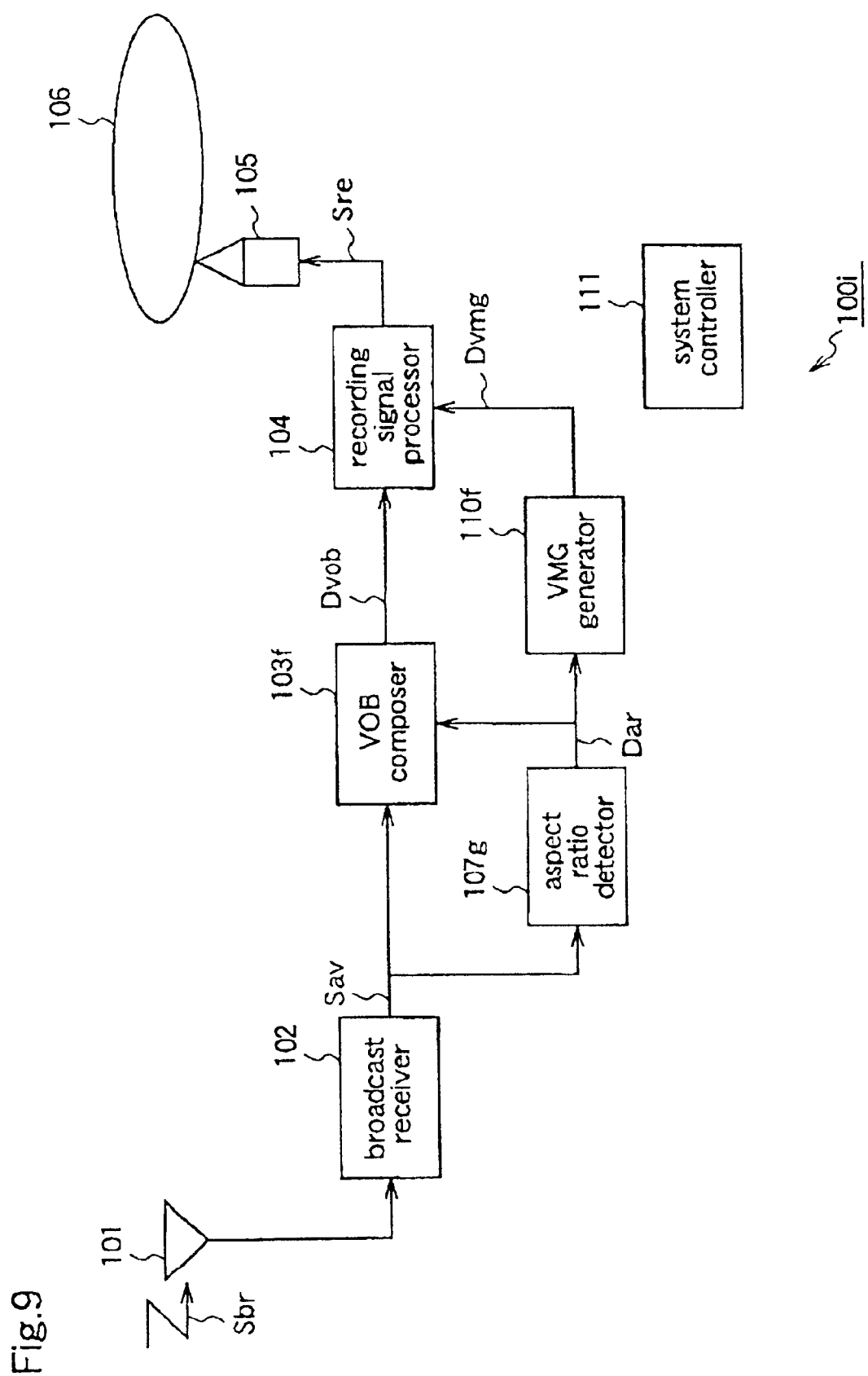
FIG. 9 is a block diagram for explaining a recording apparatus accord ng to a ninth embodiment of the present invention.

FIG. 9 is a block diagram for explaining a recording apparatus 100i according to a ninth embodiment of the present invention.

The recording apparatus 100i includes a, aspect ratio detector 107g instead of the video resolution detector 107d according to the sixth embodiment. The aspect ratio detector 107g receives an audio video stream Sav, detects the aspect ratio of the video stream included in the audio vide stream Sav by analyzing the header information of the video stream, and outputs data Dar indicating the aspect ratio. The aspect ratio data Dar is output to the VOP composer 103f and the VMG generator 110f. Other constituents of the recording apparatus 100i are identical to those of the recording apparatus 100f according to the sixth embodiment.

The aspect ratio detector 107g detects, as the aspect ratio, a ratio such as 16:9 or 4:3, the type of letter box, or the like.

Hereinafter, the operation of the recording apparatus 100i will be described.

In the recording apparatus 100i, the broadcast signal Sbr is received by the broadcast receiver 102, and the audio video stream Sav outputted from the receiver 102 is input to the VOB composer 103f through the packing unit (not shown). The VOP data Dvob frog the VOP composer 103 is converted to a recording signal Sre by the recording signal processor 104, and the recording signal Sre is written in the optical disk 10t by the recording head 105.

The receiver 102, the packing unit (not shown), the VOB composer 103f, the recording signal processor 104, and the recording head 105 operate in the same way as described for the sixth embodiment.

In this ninth embodiment, in the aspect ratio detector 107g, the aspect ratio data Dar indicating the aspect ratio of the video frame is detected by analyzing the header of the video stream included in the audio video stream Sav, and the aspect ratio data Dar so detected is output to the VOP composer 103f and the VMG generator 101t.

In the VOB composer 103f, when the aspect ratio changes during recording of the audio video stream Sav, VOB data Dvob corresponding to the audio video stream Sav is formed so that the stream before the aspect ratio change and the stream after the aspect ratio change are separated as different VOB data.

In the VMG generator 110f, VMG information Dvmg as management information for recorded VOB data is generated, and the VMG information Dvmg is output to the recording signal processor 104. In the processor 104, the VMG information Dvmg is subjected to addition of error correcting code and to recording modulation, thereby generating a recording signal Sre corresponding to the VMG information Dvmg. The recording signal Sre is recorded on the optical disk 106 by the optical head 105.

As shown in FIG. 18, the VMG information Dvmg includes, as management information for each VOB, recording start address information, search information, video attribute information, and audio attribute information.

As described above, the recording apparatus 100i of this ninth embodiment is provided with the VOB composer 103f which generates VOB data so that, when the aspect ratio changes, the stream before the aspect ratio change and the stream after the aspect ratio change are separated as different VOB data, as a VOB composer for converting the audio video stream Sav into VOB data according to the format of the DVD recording standard. Therefore, the aspect ratio can be unified for one VOB data. Accordingly, when playing the signal recorded on the optical disk 106, decoding of each VOB data can be performed on the basis of the aspect ratio which is managed in VOB units.

Further, when playing the audio video stream, reading the VMG information Dvmg enables quick access to the recording position in the stream where the aspect ratio changes.

While in the first to ninth embodiments a digital broadcast signal is input to the recording apparatus, a broadcast signal to be input to the recording apparatus is not restricted thereto, and it may be an analog TV signal.

In this case, information relating to the video attribute, such as video resolution or aspect ratio, and information relating to the audio attribute are detected on the basis of information superposed in the vertical blanking period.

Further, while in the first to ninth embodiments the output from the broadcast receiver 102 is recorded after converting it into data according to the DVD recording standard, means for performing compressive coding on the output of the receiver 102 may be provided and the output from this coding means may be recorded after converting it into data according to the DVD recording standard.

Further, while in the first to ninth embodiments information relating to the recording address of the point where the video attribute (e.g., video resolution or aspect ratio) or the audio attribute changes is recorded as the VMG information which is management information for each VOP, information relating to the attribute charge point is not restricted to the address information. For example, the recording time at which the video or audio attribute changes, based on the recording start time, may be used as the VMG information.

In this case, in order to make quick access to the recorded data corresponding to the predetermined recording tire, information indicating a time map for associating the recording time with a recording address is required. According to the time map, the recording time is converted into th recording address, and recorded data corresponding to the obtained recording address is accessed.

[Embodiment 10]

Figure 10:
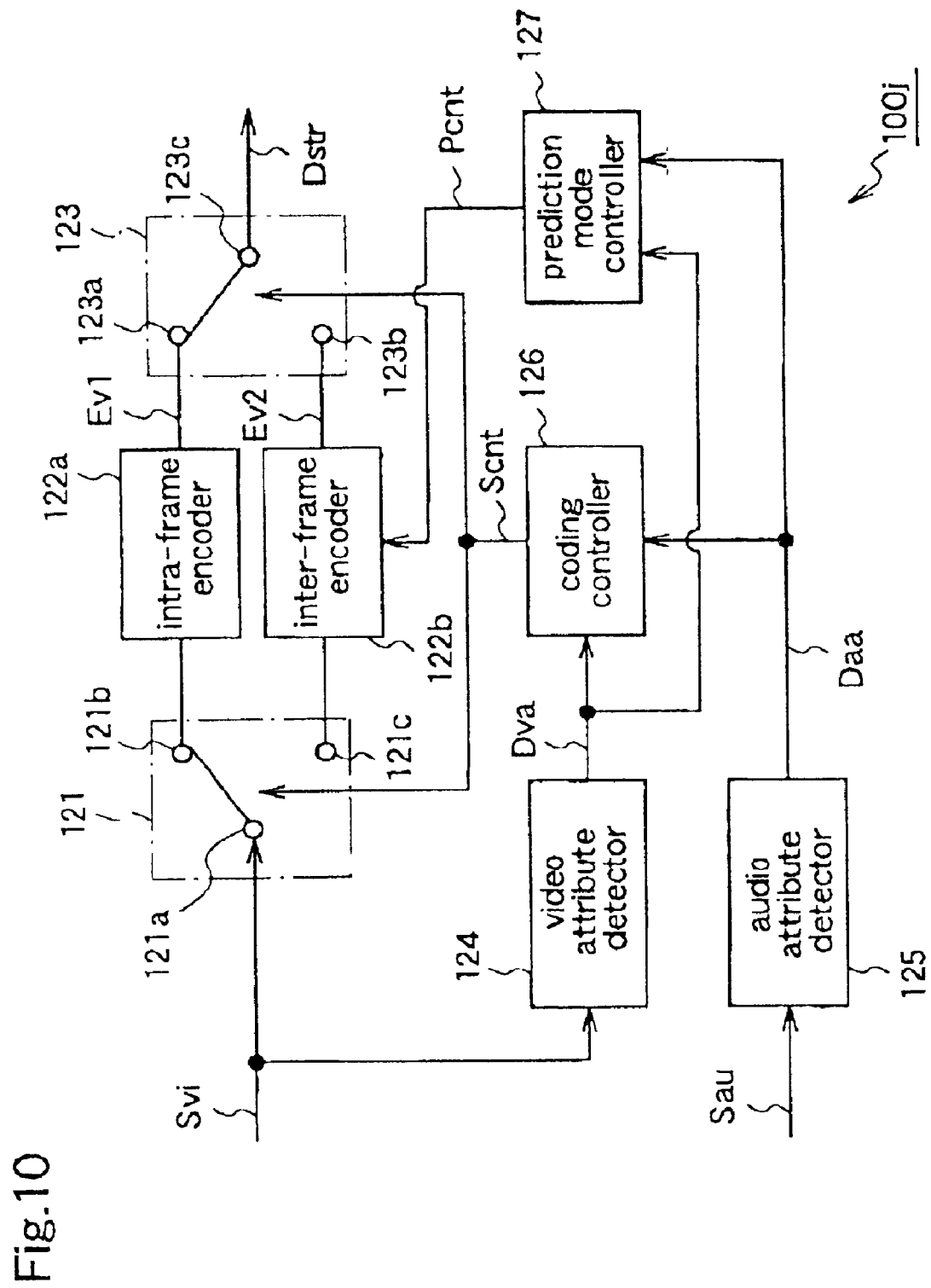
FIG. 10 is a block diagram for explaining a coding apparatus according to a tenth embodiment of the present invention.

FIG. 10 is a block diagram for explaining a coding apparatus 100j according to a tenth embodiment of the present invention.

The coding apparatus 100j is an apparatus for coding a video signal included in an audio video signal on the basis of the video attribute and the audio attribute.

To be specific, the coding apparatus 100j includes an intra-frame encoder 122a for subjecting a video signal Svi to intra-frame coding to generate first coded data Ev1, and an inter-frame encoder 122b for subjecting the video signal Svi to inter-frame coding to generate second coded data Ev2.

The intra-frame encoder 122a subjects the video signal Svi of a frame to be processed to Intra-frame coding using only data within this frame. For example, the encoder 122a performs I frame coding base on MPEG. The inter-frame encoder 122b subjects the video signal Svi corresponding to a target frame to be processed to inter-frame predictive coding with reverence to image data of an already processed frame other than the target frame. For example, the encoder 122b performs P or B frame coding based on MPEG.

The coding apparatus 100j further includes an input-side switch 121 for supplying the video signal Svi to either the encoder 122a or the encoder 122b according to a control signal Scnt, and an output-side switch 123 for selecting either the first coded data Evi or the second coded data Ev2 according to the control signal Scnt, and outputting the selected coded data as a video stream Dstr.

The input-side switch 121 has an input terminal 121a to which the video signal Svi is applied, a first output terminal 121b for supplying the video signal Svi to the intra-frame encoder 122a, and a second output terminal 121c for supplying the video signal Svi to the inter-frame encoder 122b. The input-side switch 121 connects the input terminal 121a to either the first output terminal 121b or the second output terminal 121c according to the switch control signal Scnt. The output side switch 123 has a first input terminal 123a to which the first coded data Ev1 is applied, a second input terminal 123b to which the second coded data Ev2 is applied, and an output terminal 123c for outputting the video stream Dstr. The output-side switch 123 connects either the first input terminal 123a or the second input terminal 123b to the output terminal 123c according to the switch control signal Scnt.

The coding apparatus 100j further includes a video attribute detector 124 and an audio attribute detector 125. The video attribute detector 124 detects the video attribute on the basis of the video signal Svi included in the audio video signal, and outputs video attribute data Dva. The audio attribute detector 125 detects the audio attribute on the basis of the audio signal Sau included in the audio video signal, and outputs audio attribute data Daa.

Further, the coding apparatus 100j includes a coding controller 126 and a prediction mode controller 127. The coding controller 126 outputs the switch control signal Scnt to the respective switches 121 and 123 on the basis of the video attribute data Dva and the audio attribute data Daa. The prediction mode controller 127 outputs a coding control signal Pcnt for controlling inter-frame coding, to the inter-frame encoder 122b, on the basis of the video attribute data Dva and the audio attribute data Daa.

Figure 17:
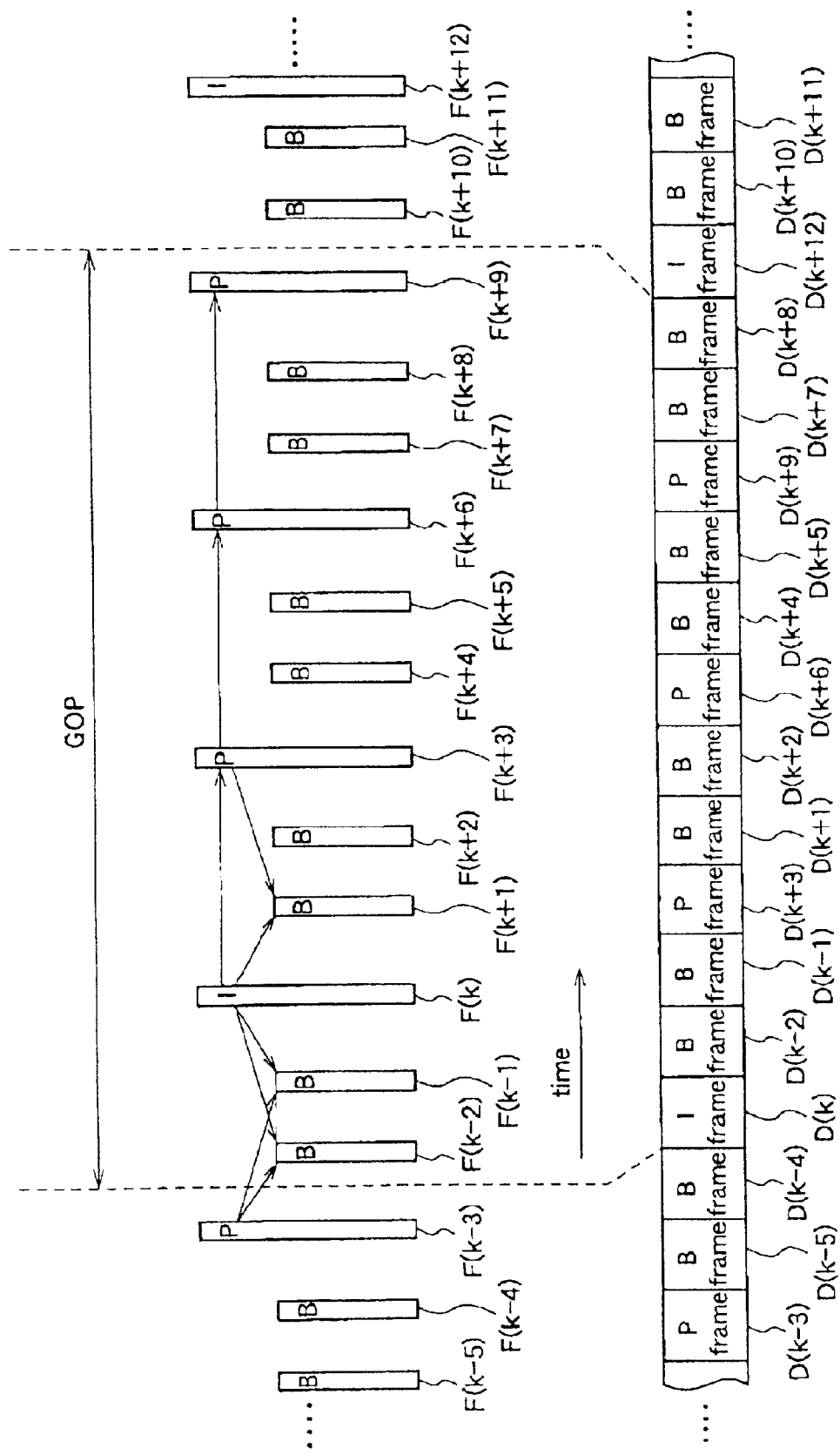
FIG. 17 is a diagram illustrating the structure of one GOP based on MPEG coding, and the structure of coded data corresponding to the GOP.

With reference to FIG. 17, in the state where there is no change in the video attribute and the audio attribute, the coding controller 126 controls the input-side and output-side switches 121 and 123 so that intra-frame coding and inter-frame coding are performed cyclically, thereby forming a GOP comprising a predetermined number of frames. On the other hand, when the video attribute or the audio attribute changes, the coding controller 126 controls the input-side and output-side switches 121 and 123 so as to change the cycles of the intra-frame coding and the inter-frame coding, thereby matching the head of the stream after the video or audio attribute change to the head of the stream constituting the GOP.

In the state where there is no change 1 in the video attribute and the audio attribute, the prediction mode controller 127 controls the inter-frame encoder 122b so that B-frame coding is carried out by using, as reference frames, two frames positioned before and after the target B frame. On the other hand, when the video attribute or the audio attribute changes, the prediction mode controller 127 controls the inter-frame encoder 122b so that B-frame coding is carried out without using, as a reference frame, a frame included in an already processed GOP whose video attribute or audio attribute is different from that of a specific containing the target frame. The already processed GOP is a GOP which has been subjected to coding for each frame before coding of the specific GOP.

In order to peace the frame immediately before the video attribute change as the last frame in the GOP, the types of frames constituting the GOP may be adjusted by continuously performing coding so that the last several frames in the GOP are P frames or I frames.

Hereinafter, the operation of the coding apparatus 100j will be described.

When an audio video signal is input to the coding apparatus 100j, a video signal Svi included in the audio video signal and corresponding to each frame is applied to either the intra-frame encoder 122a or the inter-frame encoder 122b through the input-side switch 121.

In the intra-frame encoder 122a, the video signal Svi of the target frame is subjected to intra-frame coding without referring to image data of another frame, thereby generating first coded data (intra-frame coded data) Ev1. That is, in the intra-frame encoder 122a, the video signal Svi is independently coded using only the image data included in the target frame. To be specific, I-frame coding based on MPEG is carried out. Cn the other hand, in the inter-frame encoder 122b, the video signal Svi of the target frame is coded with reference to image data of another frame, thereby generating second coded data (inter-frame coded data) Ev2. That is, in the inter-frame encoder 122b, the video signal Svi of the target frame is subjected to inter-frame predictive coding using image data of a predetermined frame as a reference frame. To be specific, P or B frame coding based on MPEG is carried out.

The coded data generated in each encoder is output as a video stream Dstr through the output-side switch 123a.

In the video attribute detector 124, the video attribute of the video signal Svi included in the inputted audio video signal is detected, and video attribute data Dva is output to the coding controller 1260 and the prediction mode controller 127. In the audio attribute detector 125, the audio attribute of the audio signal Sau included in the inputted audio video signal is detected, and audio attribute data Daa is output to the coding controller 126 and the prediction mode controller 127.

In the coding controller 126, a control signal Scnt is output to the input-side and output side switches 121 and 123 on the basis of the video attribute data Dva and the audio attribute data Daa, and the switches 121 and 123 are controlled so that the video signal Svi of the target frame is subjected to either intra-frame coding or inter-frame coding.

For example, when there is no change in the video attribute and the audio attribute, the switches 121 and 123 are controlled so that intra-frame coding and inter-frame coding are cyclically performed as shown in FIG. 17, whereby a GOP comprising a predetermined number of frames is constituted. On the other hand, when the video attribute or the audio attribute changes, the switches 121 and 123 are controlled so that the head of the stream after the attribute change is matched to the head of the stream constituting the GOP, regardless of the cycles of intra-frame coding and inter-frame coding.

In the prediction mode controller 127, when there is no change in the video attribute and the audio attribute, the inter-frame encoder 122b is controlled so that B-frame coding is carried out by using, as reference frames, two frames positioned before and after the target B frame. On the other hand, when the video attribute or the audio attribute changes, the inter-frame encoder 122b is controlled so that B-frame coding is carried out without using, as a reference frame, a frame included in an already processed GOP whose video attribute or audio attribute is different from that of a specific GOP including the target frame.

As described above, the coding apparatus 100j of this tenth embodiment is provided with the coding controller 126 for deciding that either intra-frame coding or inter-frame coding is performed on the video signal Svi of each frame, on the basis of the video attribute data Dva and the audio attribute data Daa, and the prediction mode controller 127 for controlling the prediction mode of inter-frame coding on the basis of the attribute data Dva and Daa. When the attribute or the audio attribute changes, the coding mode and the prediction mode are controlled so that the head of the stream after the attribute change is matched to the head of the stream constituting the GOP and, further, a frame included in a GOP whose attribute is different from that of the GOP including the target frame is not used as a reference frame. Therefore, a video signal whose video attribute (e.g., coding mode, video resolution, or video aspect ratio) changes can be coded according to the coding method based on MPEG.

That is, in the coding apparatus 100*j* of this tenth embodiment, even when the video attribute or the audio attribute changes, since the stream of the first frame after the attribute change is matched to the stream of the head frame of the GOP, it is possible to make access to the video or audio attribute change point in the video stream recorded on the recording medium, with the GOP as the access unit.

Further, since a frame included in a GOP whose video or audio attribute is different from that of the target frame is not used as a reference frame for the target frame, independent coding can be performed on each of the GOPs before and after the attribute change point and, therefore, coding and decoding can be performed without failure even when the video or audio attribute changes.

[Embodiment 11]

Figure 11:
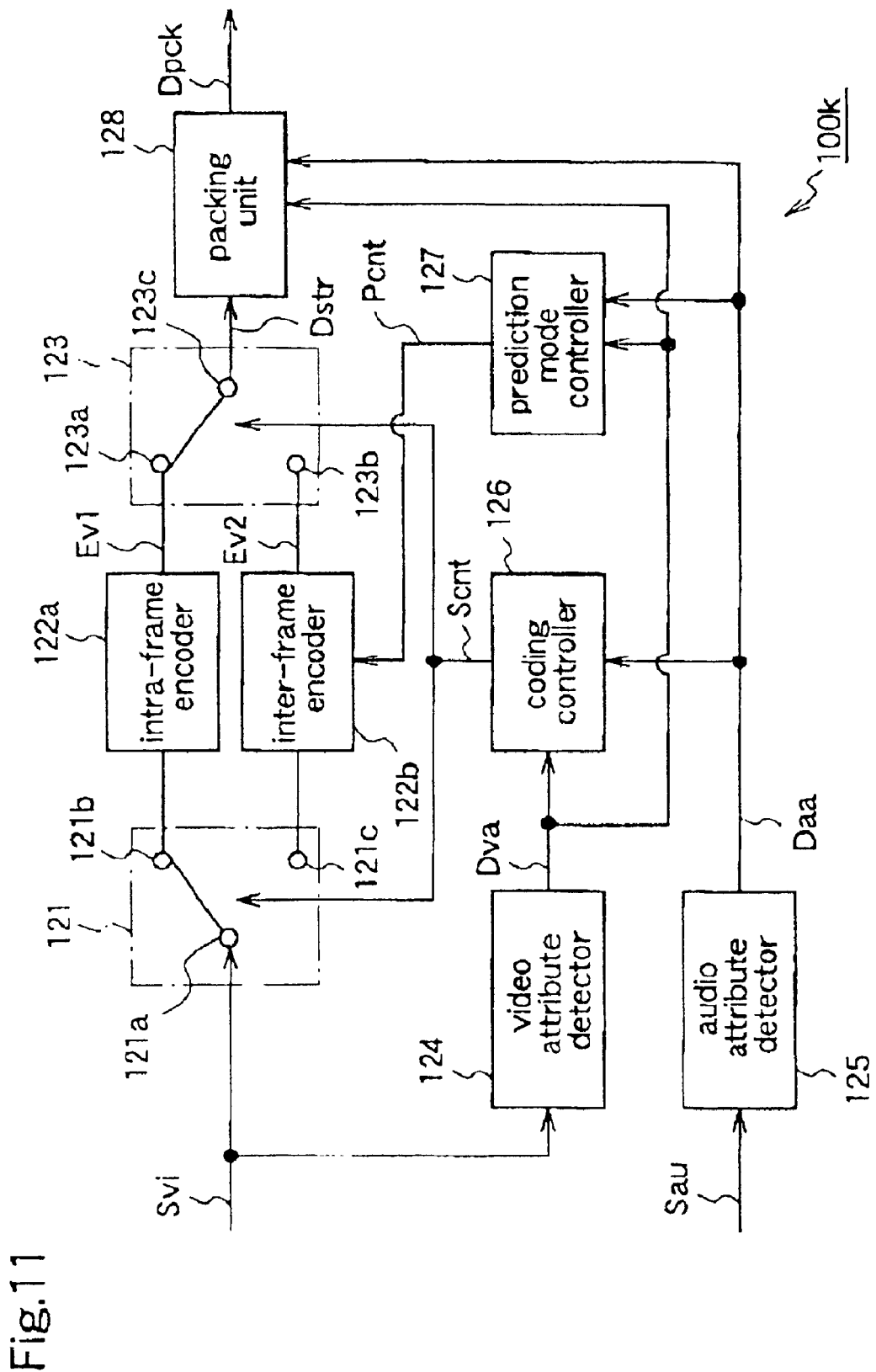
FIG. 11 is a block diagram for explaining a cowing apparatus according to an eleventh embodiment of the present invention.

FIG. 11 is a block diagram for explaining a coding apparatus 100*k* according to an eleventh embodiment of the present invention.

This coding apparatus 100*k* includes a packing unit 128 in addition to the constituents of the coding apparatus 100*j* according to the tenth embodiment. The packing unit 128 subject the video stream Dstr outputted from the output-side switch 123 to packing on the basis of the video attribute data Dva and the audio attribute data Daa, and outputs the packed video stream Dpck. The packing process is to divide the video stream Dstr into streams corresponding to data units (packs) each having a predetermined size.

In the state where there is no change in the video attribute and the audio attribute, the packing unit 128 performs packing on the video stream Dstr so that the video stream Dstr is divided into streams corresponding to data units (packs) each having a predetermined size. On the other hand, when the video attribute or the audio attribute changes, the packing unit 128 performs packing on the video stream Dstr so that the head of the stream after the video or audio attribute change is matched to the head of the stream stored in the pack.

More specifically, when an attribute change occurs in the state where the stream is being stored in a specific pack, the packing unit 128 inserts predetermined padding data in this pack instead of the stream after the attribute change. The method for storing only the streams of the same attribute in the pack when an attribute change occurs is not restricted to the above-mentioned method of inserting predetermined padding data instead of the stream after the attribute change. For example, when the attribute changes, the pack size in the header information of the pack may be changed to prevent the stream after the attribute change from being included in this pack, following the stream before the attribute change.

Other constituents of the coding apparatus 100*k* are identical to those of the coding apparatus 100*j* of the tenth embodiment.

Next, the function and effect will be described.

In the coding apparatus 100*k* of this eleventh embodiment, like the coding apparatus 100*j*, of the tenth embodiment, when the video attribute or the audio attribute changes, coding of the video signal is performed so that the stream of the first frame after the attribute change is matched to the stream of the head frame of the GOP.

Then, in the packing unit 128, the packing process of dividing the video stream into packs of a predetermined size is performed so that the video or audio attribute change point in the stream is matched to the head of the pack. To be specific, when the attribute change occurs while the stream is being stored in a specific pack, predetermined padding data is inserted in this pack instead of the stream after the attribute change.

As described above, the coding apparatus 100*k* of this eleventh embodiment is provided with the packing unit 128 in addition to the constituents of the tenth embodiment, and when an attribute change occurs while the stream is being stored in a specific pack, this packing unit 128 inserts predetermined padding data in this pack instead or the stream after the attribute charge. Therefore, it is possible to make quick access to the change point of the video attribute, such as the video resolution, in the pack data Dpck which is recorded on the recording medium according to address management in pack units.

[Embodiment 12]

Figure 12:
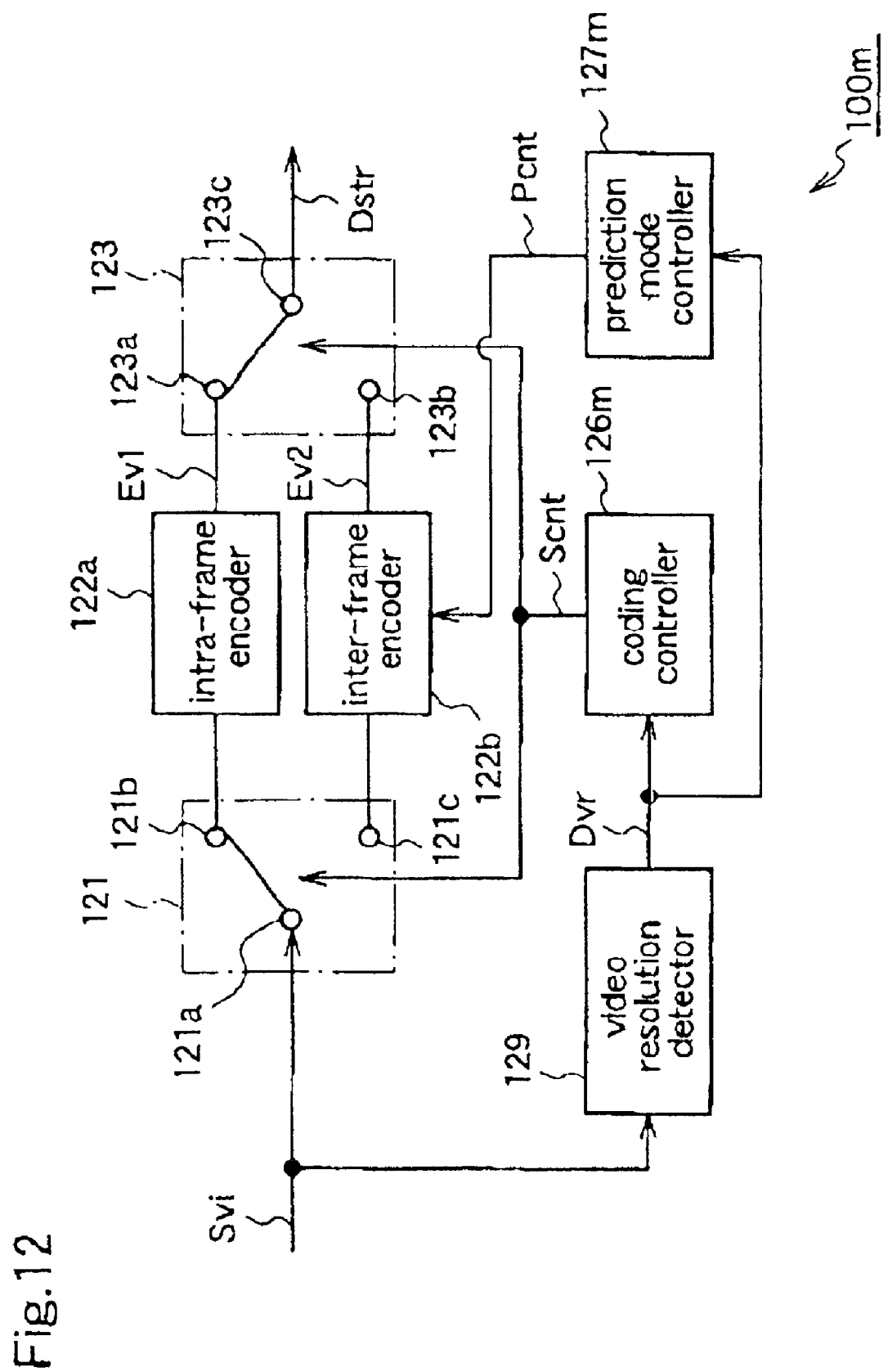
FIG. 12 is a block diagram for explaining a coding apparatus according to a twelfth embodiment of the present invention.

FIG. 12 is a block diagram for explaining a coding apparatus 100*m* according to a twelfth embodiment of the present invention.

The coding apparatus 100*m* includes a video resolution detector 129 instead of the video attribute detector 124 and the audio attribute detector 125 of the coding apparatus 100*j* according to the tenth embodiment. The video resolution detector 129 detects the video resolution on the basis of the video signal Svi included in the audio video signal, and outputs video resolution data Dvr. Preferably, the video resolution detector 129 detects, as the video resolution, at leapt one of the horizontal frame size, vertical frame size, and frame frequency, like the video resolution detector 107*d* according to the fourth embodiment. However, the detector 129 may detect, as the video resolution, that the video signal is either an interlace signal or a progressive signal.

Further, the coding apparatus 1001*n* includes a coding controller 126*m* and a prediction mode controller 127*m* instead of the coding controller 126 and the prediction mode controller 127 of the coding apparatus 1004 according to the tenth embodiment. The coding controller 126*m* controls the respective switches 121 and 123 by using a switch control signal Scnt on the basis of the video resolution data Dvr, and the prediction mode controller 127*m* controls the inter-frame encoder 122*b* by using a coding control signal Pcnt on the basis of the video resolution data Dvr.

With reference to FIG. 17, in the state where there is no change in the video resolution, the coding controller 126*m* controls the switches 121 and 123 so that intra-frame coding and inter-frame coding are performed cyclically. On the other hand, when the video resolution changes, the coding controller 126*m* controls the swatches 121 and 123 so as to change the cycles of intra-frame coding and inter-frame coding, thereby matching the head of the stream after the resolution change to the head of the stream constituting the GOP.

In the state where there is no change in the video resolution, the prediction mode controller 127*m* controls the inter-frame encoder 122*b* so that B-frame coding is carried out by using, as reference frames, two frames positioned before and after the target B frame. On the other hand, when the video resolution changes, the prediction mode controller 127*m* controls the inter-frame encoder 122*b* so that B-frame coding is carried out without using, as a reference frame, a frame included in an already processed GOP whose video resolution is different from that of a specific GOP including the target frame.

Other constituents of the coding apparatus 100m are identical to those of the coding apparatus 100j of the tenth embodiment.

Next, the operation of the coding apparatus 100m will be described.

Figure 13:
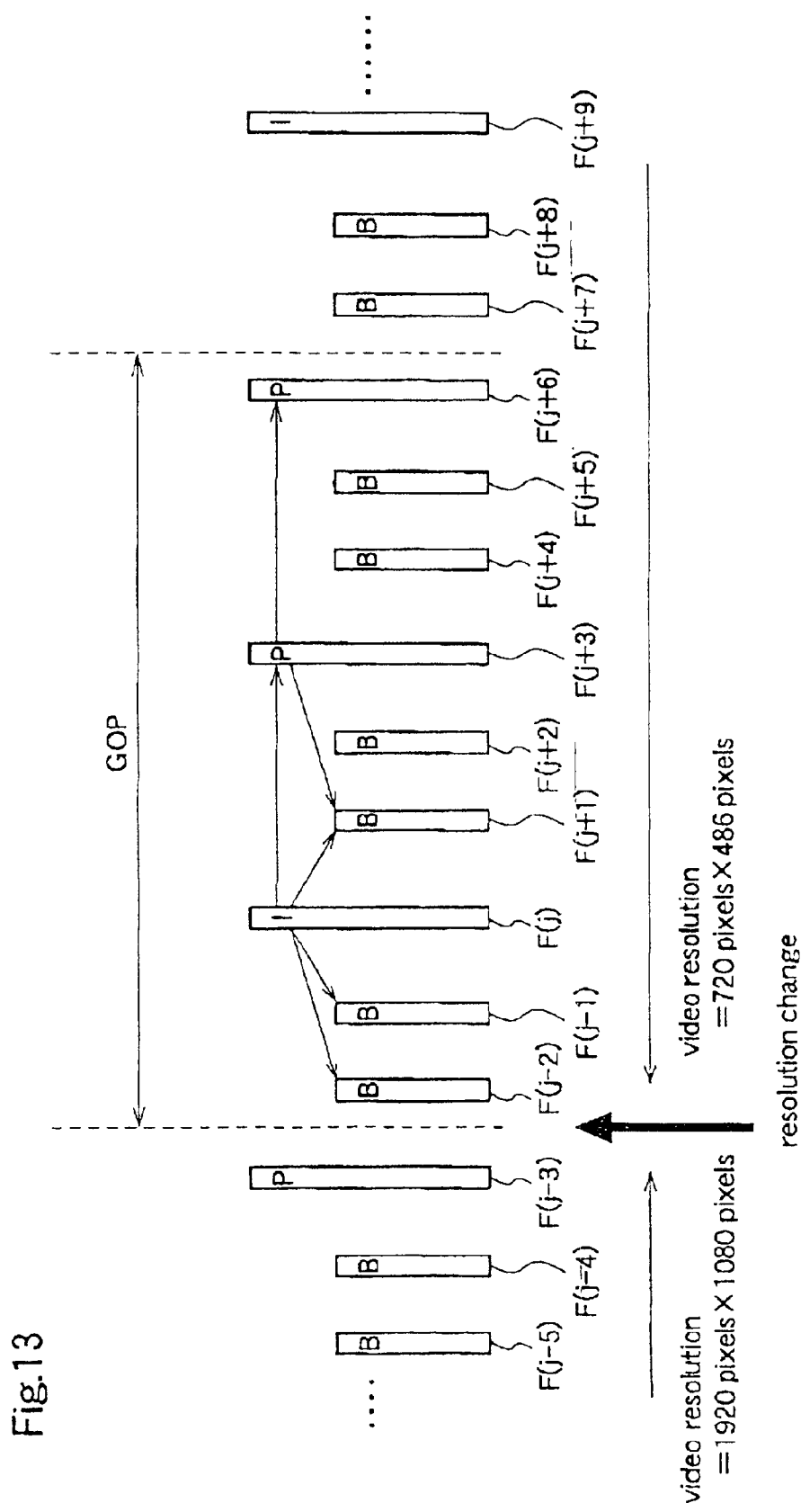
FIG. 13 is a schematic diagram for explaining the operation of the coding apparatus according to the twelfth embodiment, illustrating plural frames constituting one GOP.

FIG. 13 shows a TV signal (video signal) inputted to the coding apparatus 100m.

In FIG. 13, the video signal up to a frame F(j−3) is a high-vision signal, and the subsequent video signal from a frame F(j−2) is a standard TV signal. That is, the frame F(j−2) is a frame corresponding to the position where the video resolution changes in the video signal. In FIG. 13, F(j−5) and F(j−4) are frames corresponding to the high-vision signal, and F(j−1)~(j+3) are frames corresponding to the standard TV signal.

When the video signal shown in FIG. 13 is input to the coding apparatus 100m, the video signal is coded by either the intra-frame encoder 122a or the inter-frame encoder 122b according to the video resolution and the coding mode, and a video stream Dstr obtained in the coding process is output. The coding mode is information indicating that each frame is to be subjected to any of I-frame coding, P-frame coding, and B-frame coding, on the basis of the video signal.

Hereinafter, a brief description will be given of the operations of the video resolution detector 129, the coding controller 126m, and the prediction mode controller 127m when the video signal shown in FIG. 13 is input to the coding apparatus 100m.

The video resolution detector 129 detects the video resolution on the basis of the inputted video signal Svi, and outputs video resolution data Dvr to the coding controller 126m and the prediction mode controller 127r.

Then, the coding controller 126m controls the switches 121 and 123 so that one GOP is completed at the frame F(j−3) and a new GOP is constituted from the next frame F(j−2). Thereby, all the frames constituting one GOP have the same video resolution. In other words, flames having different video resolutions are not mixed in one GOP.

Further, the prediction mode controller 127m controls the inter-frame encoder 122b so that only the I frame F (j) is used as a reference frame when performing inter-frame coding on the B frames F(j−2), and F(j−1).

As described above, the coding apparatus 100m according to the twelfth embodiment is provided with the video resolution detector 129 for detecting the video resolution on the basis of the video signal, the coding controller 126m for deciding that the video signal Svi of each frame is to be subjected to either intra-frame coding or inter-frame coding on the basis of the video resolution data Dvr, and the prediction mode controller 127 for controlling the prediction mode of inter-frame coding on the basis of the video resolution data Dvr. Thereby, the video signal is separated into two GOPs at the video resolution change point and, further, each frame in the GOP, whose head frame corresponds to the video resolution change point, can be coded without referring to a frame of the previous GOP. Therefore, a video signal whose video resolution changes can be coded according to the MPEG coding method.

That is, in the coding apparatus 100m, even when the video attribute changes, since the stream of the first frame after the resolution change is matched to the stream of the head frame of the GOP, it is possible to make quick access to the video resolution change point in the video stream which is recorded on the recording medium with each GOP as an access unit.

Further, since a frame of a GOP whose video resolution is different from that of the target frame is not used as a reference frame for the target frame, independent coding or decoding can be performed on each of the GOPs before and after the video resolution change point, whereby coding and decoding can be performed without failure even when the video resolution changes.

While in this twelfth embodiment the head frame of the first GOP (specific GOP) after the video resolution change is a B frame, the first frame of the specific GOP may be an I frame. Also in this case, when performing inter-frame coding on the specific GOP, a frame of a GOP whose video resolution is different from that of the specific GOP is not used as a reference frame.

Further, in order to match the frame immediately before the video resolution change to the last frame in the GOP previous to the specific GOP, the type of each frame may be controlled by continuously performing coding in which the last some frames in the previous GOP are P frames or I frames.

Further, while in this twelfth embodiment coding is performed such that two B frames are placed between adjacent I fame and P frame and between adjacent two P frames, the number of B frames is not restricted thereto. For example, these B frames may be dispensed with.

[Embodiment 13]

Figure 14:
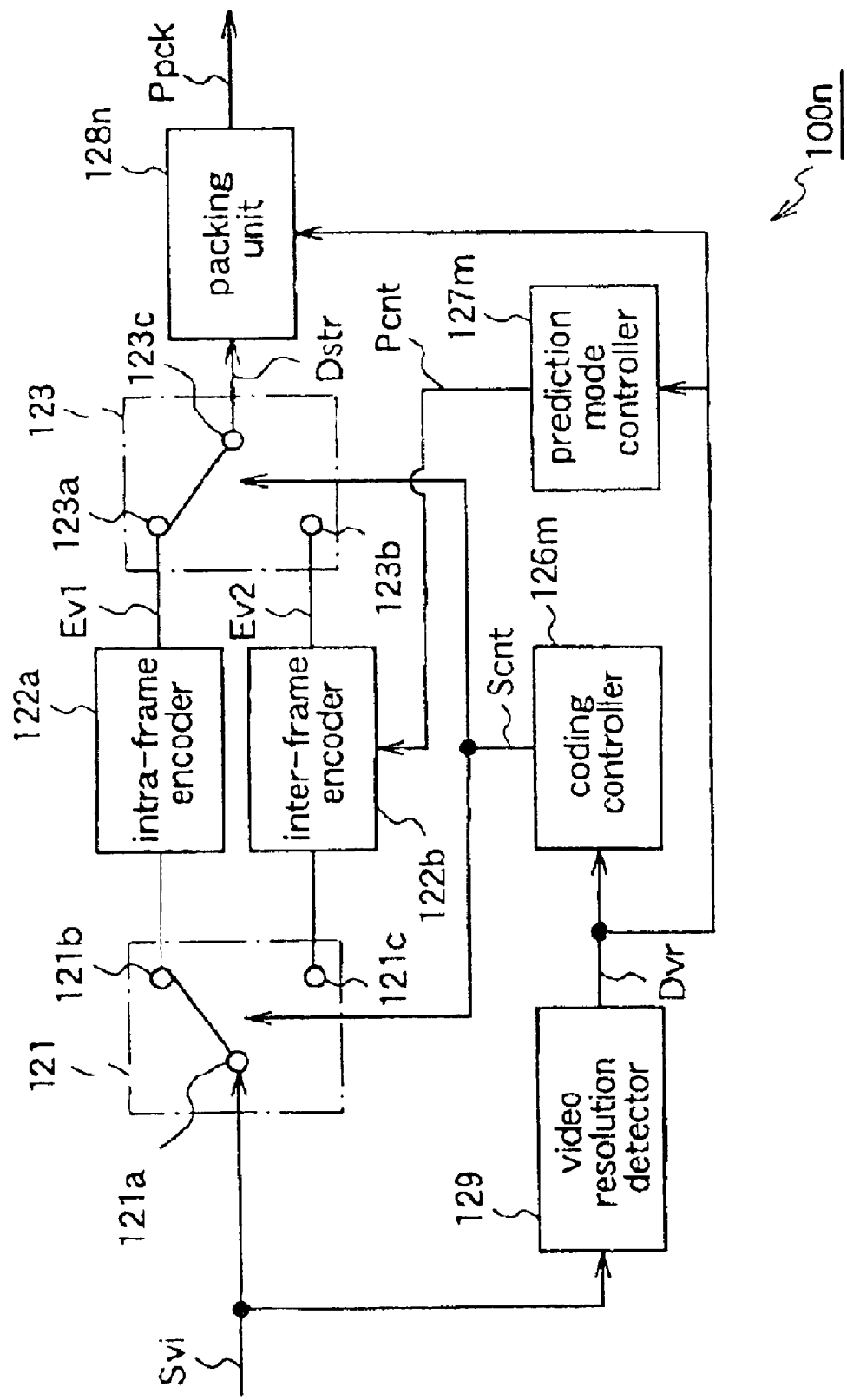
FIG. 14 is a block diagram for explaining a coding apparatus according to a thirteenth embodiment of the present invention.

FIG. 14 is a block diagram for explaining a coding apparatus 100n according to a thirteenth embodiment of the present invention.

This coding apparatus 100n includes a packing unit 128n in addition to the constituents of the coding apparatus 100m according to the twelfth embodiment. The packing unit 128n subject the video stream Dstr outputted from the output-side switch 123 to packing on the basis of the video resolution data Dvr, and outputs the packed video stream Dpck. The packing process is to divide the video stream Dstr into streams corresponding to data units (packs) each having a predetermined size.

The packing unit 128n is identical to the packing unit 128 according to the eleventh embodiment except that the unit 128n receives the video resolution data Dvr while the unit 128 receives the video attribute data Dva and the audio attribute data Daa.

That is, in the state where there is no change in the video resolution, the packing unit 128n performs packing on the video stream Dstr so that the video stream Dstr is divided into streams corresponding to data units (packs) each having a predetermined size. On the other hand, when the video resolution changes, the packing unit 128n performs packing on the video stream Dstr so that the head of the stream after the resolution change is matched to the head of the stream stored in the pack.

More specifically, when an attribute change occurs in the state where the stream is being stored in a specific pack, the packing unit 128n inserts predetermined padding data in this pack instead of the strewn after the attribute change.

Other constituents of the coding apparatus 100n are identical to those of the coding apparatus 100m according to the twelfth embodiment.

Next, the function and effect will be described.

In the coding apparatus 100n of this thirteenth embodiment, like the coding apparatus 100m of the twelfth embodiment, when the video resolution changes, coding of the video signal is performed so that the stream of the first frame after the resolution change is matched to the stream of the head frame of the GOP.

Then, in the packing unit 128n, the packing process of dividing the video stream into packs of a predetermined size is performed so that the video resolution change point in the stream is matched to the head of the pack. To be specific, when the attribute change occurs while the stream is being stored in a specific pack, predetermined padding data is inserted in this pack instead of the stream after the resolution change.

As described above, the coding apparatus 100n of this thirteenth embodiment is provided with the packing unit 128n in addition to the constituents of the twelfth embodiment, and when the video resolution changes while the stream is being stored in a specific pack, this packing unit 128n inserts predetermined padding data in this pack instead of the stream after the resolution change. Therefore, it is possible to make quick access to the video resolution change point in the pack data Dpck which is recorded on the recording medium according to address management in pack units.

[Embodiment 14]

Figure 15:
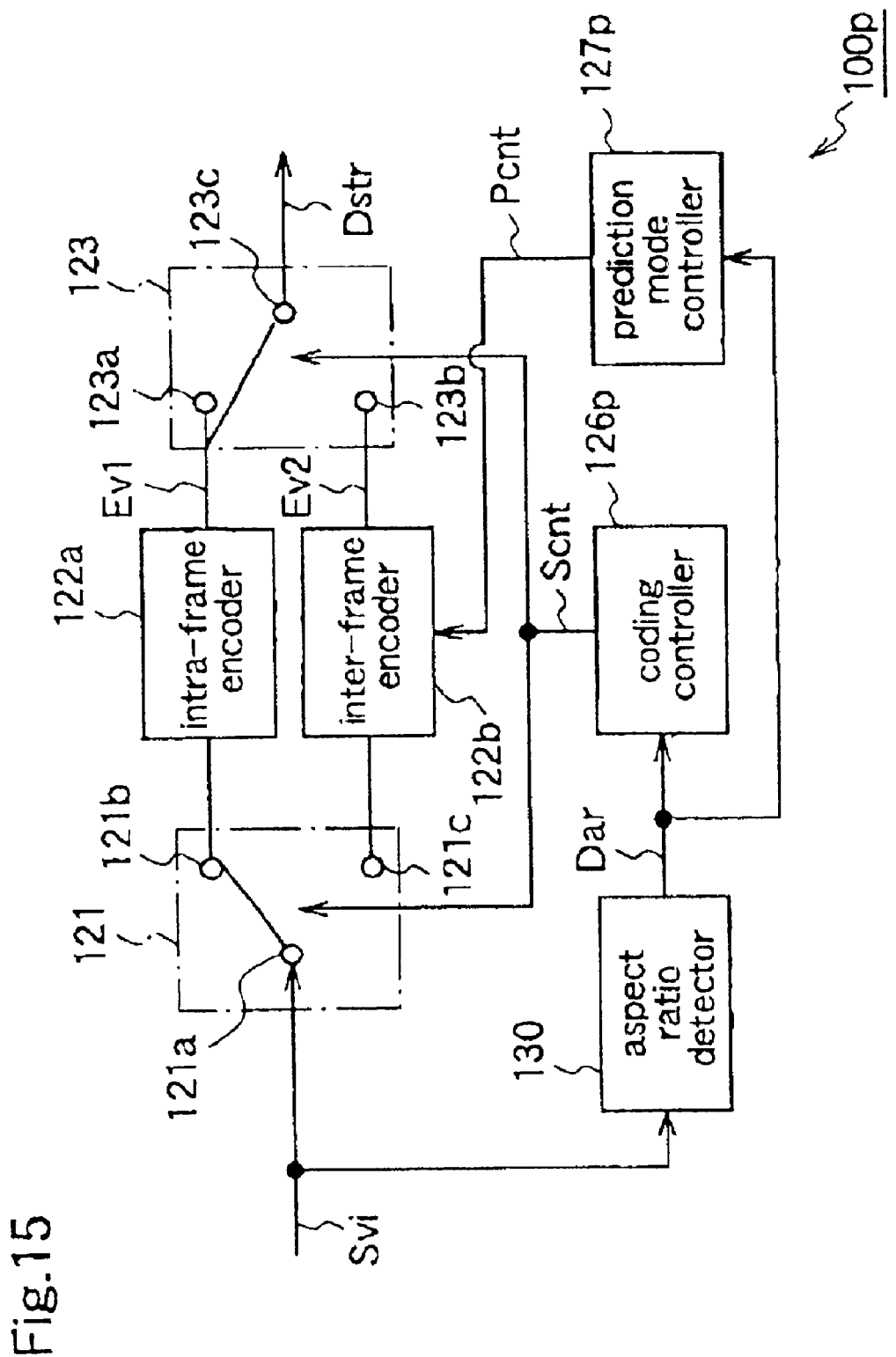
FIG. 15 is a block diagram for explaining a coding apparatus according to a fourteenth embodiment of the present invention.

FIG. 15 's a block diagram illustrating a coding apparatus 100p according to a fourteenth embodiment of the present invention.

The coding apparatus 100p includes an aspect ratio detector 130 instead of the video attribute detector 124 and the audio attribute detector 125 of the coding apparatus 100j according to the tenth embodiment. The aspect ratio detector 130 detects the aspect ratio on the basis of the video signal Svi included in the audio video signal, and outputs aspect ratio data Dar. The aspect ratio detector 130 detects the aspect ratio by reading aspect ratio information which is embedded in the vertical blanking period of the video signal. Further, the aspect ratio detector 130 detects the value of the aspect ratio (16:9 or 9:3), the letter box information., or the like.

Further, the coding apparatus 100p includes a coding controller 126p and a prediction mode controller 127p instead of the coding controller 126 and the prediction mode controller 127 of the coding apparatus 1001 according to the tenth embodiment. The coding controller 126p controls the respective switches 121 and 123 by using a switch control signal Scnt on the basis of the aspect ratio data Dar, and the prediction mode controller 127p controls the inter-frame encoder 122b by using a coding control signal Pcnt on the basis of the aspect ratio data Dar.

With reference to FIG. 17, in the state where there is no change in the aspect ratio, the coding controller 126p controls the switches 121 and 123 so that intra-frame coding and inter-frame coding are performed cyclically. On the other hand, when the aspect ratio changes, the coding controller 126p controls the switches 121 and 123 so as to change the cycles of intra-frame coding and inter-frame coding, thereby matching the head of the stream after the aspect ratio change to the head of the stream constituting the GOP.

In the state where there is no change in the aspect ratio, the prediction mode controller 127p controls the inter-frame encoder 122b so that B-frame coding is carried out by using, as reference frames, two frames positioned before and after the target 3 frame. On the other hand, when the aspect ratio changes, the prediction mode controller 127p controls the inter-frame encoder 122b so that B-frame coding is carried out without using, as a reference frame, a frame included in an already processed GOP whose aspect ratio is different from that of a specific GOP including the target frame.

Other constituents of the coding apparatus 100p are identical to those of the coding apparatus 100j of the tenth embodiment.

Next, the operation of the coding apparatus 100p will be described.

When the video signal Svi is input to the coding apparatus 100p, the video signal Svi is coded by either the intra-frame encoder 122a or the inter-frame encoder 122b according to the change of the aspect ratio, and a video stream Dstr obtained in the coding process is output.

That is, the aspect ratio detector 130 detects the aspect ratio on the basis of the inputted video signal Svi, and outputs aspect ratio data Dar to the coding controller 120p and the prediction mode controller 127p.

The coding controller 126p controls the switches 121 and 123 so that one GOP is completed at the frame just before the aspect ratio change and a new GOP is constituted from the next frame. Thereby, all the frames constituting one GOP have the same aspect ratio. In other words, frames having different aspect ratios are not mixed in one GOP.

The prediction mode controller 127p controls the inter-frame encoder 122b so that a frame of a GOP whose aspect ratio is different from that of the target frame is not used as a reference frame for the target frame.

As described above, the coding apparatus 100p according to the fourteenth embodiment is provided with the aspect ratio detector 130 for detecting the aspect ratio in the basis of the video signal, the coding controller 126p for deciding that the video signal Svi of each frame is to be subjected to either intra-frame coding or inter-frame coding on the basis of the aspect ratio data Dar, and the prediction mode controller 127p for controlling the prediction mode of inter-frame coding on the basis of the aspect ratio data Dar. Thereby, the video signal is separated into two GOPs at the aspect ratio charge point and, further, each frame in the GOP, whose head frame corresponds to the aspect ratio change point, can be coded without referring to a frame in the previous GOP. Therefore, a video signal whose aspect ratio changes car be coded according to the MPEG coding method.

That is, in the coding apparatus 100p, even when the aspect ratio changes, since the stream of the first frame after the aspect ratio charge is matched to the stream of the head frame of the GOP, quick access can be made to the aspect ratio change point in the video stream which is recorded on the recoding medium with each GOP as an access unit.

Further, since a frame of a GOP whose aspect ratio is different from that of the target frame is not used as a reference frame for the target frame, independent coding or decoding can be performed on each of the GOPs before and after the aspect ratio change point. Therefore, coding and decoding can be performed without failure even when the aspect ratio changes.

While in this fourteenth embodiment the head frame of the first GOP (specific GOP) after the aspect ratio change is a B frame, the first frame of the specific GOP may be an I frame. Also in this case, when performing inter-frame coding on the specific GOP, a frame in a GOP whose aspect ratio is different from that of the specific GOP is not used as a reference frame.

Further, in order to match the frame immediately before the aspect ratio change to the last frame in the GOP previous to the specific GOP, the type of each frame may be controlled by continuously performing coding such that the last some frames in the previous GOP are P frames or I frames.

Further, while in this fourteenth embodiment coding is performed such that two B frames are placed between adjacent I frame and P frame and between adjacent two P frames, the number of B frames is not restricted thereto. For example, these B flames may be dispensed with.

[Embodiment 15]

Figure 16:
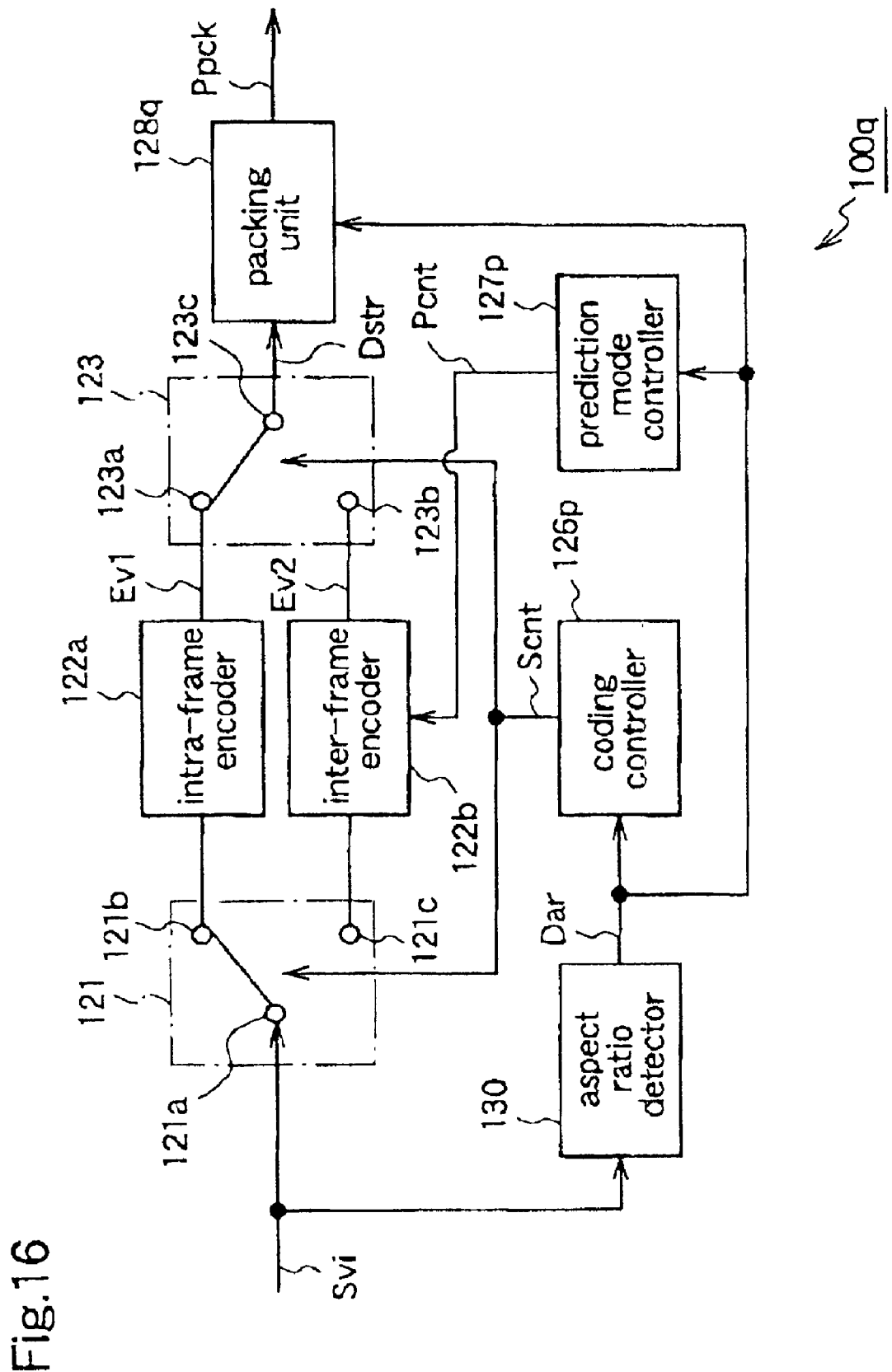
FIG. 16 is a block diagram for explaining a coding apparatus according to a fifteenth embodiment of the present invention.

FIG. 16 is a block diagram for explaining a coding apparatus 100q according to a fifteenth embodiment of the present invention.

This coding apparatus 100a includes a packing unit 128u in addition to the constituents of the coding apparatus 100p according to the fourteenth embodiment. The packing unit 128q subject the video stream Dstr outputted from the output-side switch 123 to packing on the basis of the aspect ratio data Dar, and outputs the packed video stream Dpck. The packing process is to divide the video stream Dstr into streams corresponding to data units (packs) each having a predetermined size.

The packing unit 128q is identical to the packing unit 128 according to the eleventh embodiment except that the unit 128q receives the aspect ratio data Dar while the unit 128 receives the video attribute data Dva and the audio attribute data Daa.

That is, in the state where there is no change in the aspect ratio, the packing unit 128q performs packing on the video stream Dstr so that the video stream Dstr is divided into streams corresponding to data units (packs) each having a predetermined size. On the other hand, when the aspect ratio changes, the packing unit 128q performs packing on the video stream, Dstr so that the head of the stream after the aspect ratio change is matched to the head of the stream stored in the sack.

More specifically, when the aspect ratio changes in the state where the stream is being stored in a specific pack, the packing unit 128q inserts predetermined padding data in this pack instead of the stream after the aspect ratio change.

Other constituents of the coding apparatus 100q are identical to hose of the coding apparatus 100k according to the fourteenth embodiment.

Next, the function and effect will be described.

In the coding apparatus 00q of this fifteenth embodiment, like the coding apparatus 100p of the fourteenth embodiment, when the aspect ratio changes, coding of the video signal is performed so that the stream of the first frame after the aspect ratio change is matched to the stream of the head frame of the GOP.

Then, in the packing unit 128q, the packing process of dividing the video stream into packs of a predetermined size is performed so that the aspect ratio change point in the stream is matched to the head of the pack. To be specific, when the aspect ratio changes while the stream is being stored in a specific pack, predetermined padding data is inserted in this pack instead of the stream after the aspect ratio chance.

As described above, the coding apparatus 100q of this fifteenth embodiment is provided with the packing unit 128q in addition to the constituents of the fourteenth embodiment, and when the aspect ratio changes while the stream is being stored in a specific pack, this packing unit 128q inserts predetermined padding data in this pack instead of the stream after the aspect ratio change. Therefore, it is possible to make quick access to the aspect ratio change point in the pack data Dpck which is recorded on the recording medium according to address management in pack units.

The recording apparatuses according to the first to ninth embodiments and the coding apparatuses according to the tenth to fifteenth embodiments can be implemented by software in a computer system, with the same effects as described above.

Further, while in the first to ninth embodiment an optical disk is described as a recording medium, a recording medium on which an audio video stream is recorded is not restricted thereto. Any recording medium may be employed so long as it can store digital data.

What is claimed is:

1. A recording apparatus for recording, on a recording medium, an audio video stream which is obtained by coding an audio video signal including an audio signal and a video signal, said apparatus comprising:

a packing unit operable to perform packing to divide the audio video stream into plural streams corresponding to packs each having a predetermined size, and operable to output the audio video stream corresponding to each pack as pack data, said packs being data units for use in managing a recording position of the audio video stream on the recording medium;

a recorder operable to record each pack data on the recording medium, as an access unit to the recording medium; and an attribute detector operable to detect an attribute relating to at least one of the video signal and the audio signal, and output attribute data indicating the attribute; and wherein, for each of said packs, said packing unit performs the packing such that a position in the audio video stream, where the attribute changes, is positioned at a head of the pack.

2. The recording apparatus of claim 1, wherein:

said attribute detector detects a video attribute relating to the video signal and an audio attribute relating to the audio signal on the basis of the audio video stream, and outputs video attribute data indicating the video attribute and audio attribute data indicating the audio attribute; and said recorder records the video attribute data and the audio attribute data in predetermined areas of the recording medium, respectively.

3. The recording apparatus of claim 1 further comprising:

an information generator operable to detect a recording position in the audio video stream recorded on the recording medium, which recording position corresponds to a point where at least one of the audio attribute and the video attribute changes, or a recording time of the audio video stream based on a reference time, which recording time corresponds to the attribute change point, and operable to output attribute change information indicating the recording position or the recording time;

wherein said recorder records the attribute change information on the recording medium.

4. The recording apparatus of claim 1, wherein:

said attribute detector detects a video resolution of the video signal as an attribute relating to the video signal, and outputs video resolution data indicating the resolution; and said packing unit performs the packing, on the basis of the video resolution data, such that a position in the video stream, where the video resolution changes, is positioned at a head of one of the packs.

5. The recording apparatus of claim 1, wherein:

said attribute detector detects an aspect ratio of the video signal as an attribute relating to the video signal, and outputs aspect ratio data indicating the aspect ratio; and said packing unit performs the packing, on the basis of the aspect ratio data, such that a position in the video stream, where the aspect ratio changes, is positioned at a head of one of the packs.

6. A recording apparatus for recording, on a recording medium, an audio video stream which is obtained by coding an audio video signal including an audio signal and a video signal, said apparatus comprising:

a video object composer operable to divide the audio video stream into plural streams corresponding to management units for use in managing the audio video stream, and operable to output the stream corresponding to each management unit as video object data;

a recorder operable to record management information for use in managing each video object data on the recording medium; and an attribute detector operable to detect a video resolution or an aspect ratio of the video signal as an attribute relating to the video signal on the basis of the audio video stream, and operable to output attribute data indicating the video resolution or the aspect ratio;

wherein when the attribute changes, said video object composer divides the audio video stream, on the basis of the attribute data, such that a portion of the audio video stream before the attribute change point and a portion of the audio video stream after the attribute change point are output as different video object data.

7. The recording apparatus of claim 6, wherein said management information includes information relating to the recording position of each video object data on the recording medium, or the recording time of each video object data based on a reference time.

8. The recording apparatus of claim 6, wherein:

said attribute detector detects the video resolution or the aspect ratio which is a video attribute relating to the video signal and an audio attribute relating to the audio signal on the basis of the audio video stream, and outputs video attribute data indicating the video attribute and audio attribute data indicating the audio attribute; and said management information includes video attribute information indicating the video attribute and audio attribute information indicating the audio attribute.

9. The recording apparatus of claim 6, wherein:

said attribute detector detects the video resolution of the video signal as an attribute relating to the video signal, and outputs video resolution data indicating the resolution; and when the video resolution changes, said video object composer divides the video stream, on the basis of the video resolution data, such that a portion of the video stream before the video resolution change point and a portion of the video stream after the video resolution change point are output as different video object data.

10. The recording apparatus of claim 6, wherein:

said attribute detector detects the aspect ratio of the video signal as an attribute relating to the video signal, and outputs aspect ratio data indicating the aspect ratio; and when the aspect ratio changes, said video object composer divides the video stream, on the basis of the aspect ratio data, such that a portion of the video stream before the aspect ratio change point and a portion of the video stream after the aspect ratio change point are output as different video object data.

11. A coding apparatus for coding a video signal, comprising:

a video encoder operable to subject the video signal to intra-frame or inter-frame coding such that a frame group including at least one frame subjected to the inter-frame coding is generated, and a video stream corresponding to the frame group is output as a stream unit that can be accessed randomly; and a video attribute detector operable to detect a video resolution or an aspect ratio of the video signal as a video attribute of the video signal on the basis of the video signal, and operable to output video attribute data indicating the video attribute; and wherein said video encoder forms the frame group such that a specific frame, whose video attribute is different from that of a frame positioned just before it, is stored as a head frame in the frame group.

12. The coding apparatus of claim 11 further comprising:

an audio attribute detector operable to detect for an audio attribute of an audio signal appended to the video signal, and operable to output audio attribute data indicating the audio attribute;

wherein said video encoder forms the frame group such that a specific frame, whose video or audio attribute is different from that of a frame positioned just before it, is stored as a head frame in the frame group.

13. The coding apparatus of claim 12 further comprising:

a packing unit operable to perform packing to divide the video stream into plural streams corresponding to packs as data units each having a predetermined size, and operable to output the stream corresponding to each pack as pack data;

wherein, for each of said packs, said packing unit performs the packing such that a position in the video stream, where the video or audio attribute changes, is positioned at a head of the pack.

14. The coding apparatus of claim 11, wherein said video encoder performs coding on each frame in the frame group including the specific frame, without referring to the video signal corresponding to frames in a frame group which has been coded previously to the frame group.

15. The coding apparatus of claim 11, wherein:

said video attribute detector detects the video resolution of the video signal as a video attribute on the basis of the video signal, and outputs video resolution data indicating the video resolution; and said video encoder forms the frame group, on the basis of the video resolution data, such that a specific frame, whose video resolution is different from that of a frame positioned just before it, is stored as a head frame in the frame group.

16. The coding apparatus of claim 15 further comprising:

a packing unit operable to perform packing to divide the video stream into plural streams corresponding to packs as data units each having a predetermined size, and operable to output the stream corresponding to each pack as pack data; and wherein said packing unit performs the packing such that a position in the video stream, where the video resolution changes, is positioned at a head of one of the packs.

17. The coding apparatus of claim 11 wherein:

said attribute detector detects the aspect ratio of the video signal as the video attribute on the basis of the video signal, and outputs aspect ratio data indicating the aspect ratio; and said video encoder forms the frame group, on the basis of the aspect ratio data, such that a specific frame, whose aspect ratio is different from that of a frame positioned just before it, is stored as a head frame in the frame group.

18. The coding apparatus of claim 17 further comprising:

a packing unit operable to perform packing to divide the video stream into plural streams corresponding to packs as data units each having a predetermined size, and operable to output the stream corresponding to each pack as pack data; and wherein said packing unit performs the packing such that a position in the video stream, where the aspect ratio changes, is positioned at a head of one of the packs.

* * * * *

UNITED STATES PATENT AND TRADEMARK OFFICE
CERTIFICATE OF CORRECTION

PATENT NO. : 6,856,759 B1 Page 1 of 1
DATED : February 15, 2005
INVENTOR(S) : Hideki Fukuda et al.

It is certified that error appears in the above-identified patent and that said Letters Patent is hereby corrected as shown below:

Title page,
Item [56], References Cited, U.S. PATENT DOCUMENTS, change "Magasawa" to -- Nagasawa --.

Column 40,
Lines 18-19, should read -- output attribute data indicating the attribute; --

Column 41,
Line 67, should read -- indicating the video attribute; --.

Column 42,
Line 4, should read -- an audio attribute detector operable to detect an audio --.
Lines 42 and 62, should read -- pack as pack data; --.

Signed and Sealed this

Twenty-fourth Day of May, 2005

JON W. DUDAS
*Director of the United States Patent and Trademark Office*